United States Patent
Ooi et al.

(10) Patent No.: US 11,477,396 B2
(45) Date of Patent: Oct. 18, 2022

(54) REPRODUCING DEVICE, REPRODUCING METHOD, AND PROGRAM

(71) Applicant: SONY GROUP CORPORATION, Tokyo (JP)

(72) Inventors: Tomohiro Ooi, Chiba (JP); Junji Oi, Kanagawa (JP); Satoshi Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/419,578

(22) PCT Filed: Jan. 24, 2020

(86) PCT No.: PCT/JP2020/002454
§ 371 (c)(1),
(2) Date: Jun. 29, 2021

(87) PCT Pub. No.: WO2020/162218
PCT Pub. Date: Aug. 13, 2020

(65) Prior Publication Data
US 2022/0086366 A1    Mar. 17, 2022

(30) Foreign Application Priority Data

Feb. 8, 2019    (JP) .............................. JP2019-021157

(51) Int. Cl.
*H04N 5/268*    (2006.01)
*H04N 5/232*    (2006.01)
(Continued)

(52) U.S. Cl.
CPC ......... *H04N 5/268* (2013.01); *H04N 5/23238* (2013.01); *H04N 21/21805* (2013.01);
(Continued)

(58) Field of Classification Search
CPC ............... H04N 5/268; H04N 5/23238; H04N 21/21805; H04N 21/231; H04N 21/2353; H04N 21/41407
See application file for complete search history.

(56) References Cited

U.S. PATENT DOCUMENTS

| | | |
|---|---|---|
| 2002/0005902 A1 | 1/2002 | Yuen |
| 2009/0059006 A1 | 3/2009 | Hattori |
| 2018/0181358 A1* | 6/2018 | Asai ...................... G06T 3/4038 |

FOREIGN PATENT DOCUMENTS

| | | |
|---|---|---|
| JP | 2018-110375 A | 7/2018 |
| JP | 2018-113616 A | 7/2018 |

(Continued)

*Primary Examiner* — Alazar Tilahun
(74) *Attorney, Agent, or Firm* — Paratus Law Group, PLLC

(57) ABSTRACT

The present disclosure relates to a reproducing device, a reproducing method, and a program that enable a wide angle of view video and a planar video that is a part of the wide angle of view video to be switched and viewed without a sense of incongruity. A video controller determines whether or not a line quality is capable of bearing a display of the wide angle of view video on the basis of the line quality including a line speed of the wide angle of view video supplied from a server or a remaining amount of buffer data of the wide angle of view video and the partial video. In a case where the line quality is not capable of bearing the display of the wide angle of view video, at a timing immediately before switching the display between the wide angle of view video and the partial video, after the wide angle of view video together with a white frame indicating the angle of view of the partial video corresponding to the wide angle of view video is displayed, and the display is switched to the partial video. It is applicable to a reproducing device.

19 Claims, 17 Drawing Sheets

(51) Int. Cl.
*H04N 21/218* (2011.01)
*H04N 21/231* (2011.01)
*H04N 21/235* (2011.01)
*H04N 21/414* (2011.01)

(52) U.S. Cl.
CPC ....... *H04N 21/231* (2013.01); *H04N 21/2353* (2013.01); *H04N 21/41407* (2013.01)

(56) References Cited

FOREIGN PATENT DOCUMENTS

WO  WO 2017/056943 A1  4/2017
WO  WO 2018/070092 A1  4/2018

\* cited by examiner

REPRODUCING DEVICE, REPRODUCING METHOD, AND PROGRAM

CROSS REFERENCE TO PRIOR APPLICATION

This application is a National Stage Patent Application of PCT International Patent Application No. PCT/JP2020/002454 (filed on Jan. 24, 2020) under 35 U.S.C. § 371, which claims priority to Japanese Patent Application No. 2019-021157 (filed on Feb. 8, 2019), which are all hereby incorporated by reference in their entirety.

TECHNICAL FIELD

The present disclosure relates to reproducing devices, reproducing methods, and programs, and in particular, a reproducing device, a reproducing method, and a program capable of switching between a wide angle of view video and a partial video that is a part of the wide angle of view video without a sense of incongruity for viewing.

BACKGROUND ART

A technique is proposed in which a wide angle of view video such as an entire celestial sphere video is distributed and displayed on a display device such as a head mounted display (HMD) (see Patent Document 1).

CITATION LIST

Patent Document

Patent Document 1: Japanese Patent. Application Laid-Open No. 2018-113616

SUMMARY OF THE INVENTION

Problems to be Solved by the Invention

The distribution of the wide angle of view videos, by the way, enables distribution of videos with realistic feelings. However, depending on a line condition in presentation or a live performance, there are scenes for switching between a wide angle of view video and a partial video (hereinafter, also referred to as a planar video) that is a part of the wide angle of view video.

In the technique according to Patent Document 1, in switching from a wide angle of view video to a planar video, it is not explicitly displayed at which part in the wide angle of view video the planar video is switched to.

For this reason, in a case where the wide angle of view video is switched to the planar video, a user who is a viewer cannot recognize that the planar video displayed after switching derives from which part in the wide angle of view video that the user had been viewing until then. Hence, there has been a sense of incongruity in viewing, in some cases.

The present disclosure has been made in view of such circumstances, and in particular, has an object to enable viewing without a sense of incongruity in switching between a wide angle of view video and a planar video that is a part of the wide angle of view video.

Solutions to Problems

A reproducing device according to one aspect of the present disclosure includes: a switching determination unit configured to determine whether or not a switching condition for switching a display between a wide angle of view video and a partial video is satisfied, the partial video corresponding to a partial angle of view of the wide angle of view video; and a video controller configured to selectively display the wide angle of view video and the partial video on the basis of a determination result of the switching determination unit, in which when switching the display between the wide angle of view video and the partial video on the basis of the determination result of the switching determination unit, the video controller displays the wide angle of view video, to which display information indicating an angle of view of the partial video corresponding to the wide angle of view video has been added.

A reproducing method according to one aspect of the present disclosure corresponds to the reproducing device.

According to one aspect of the present disclosure, whether or not the switching condition for switching the display between the wide angle of view video and the partial video corresponding to the partial angle of view of the wide angle of view video is satisfied, the wide angle of view video and the partial video is selectively displayed on the basis of a determination result, when switching the display between the wide angle of view video and the partial video on the basis of the determination result, the wide angle of view video, to which display information indicating the angle of view of the partial video corresponding to the wide angle of view video has been added, is displayed.

MODE FOR CARRYING OUT THE INVENTION

Figure 1:
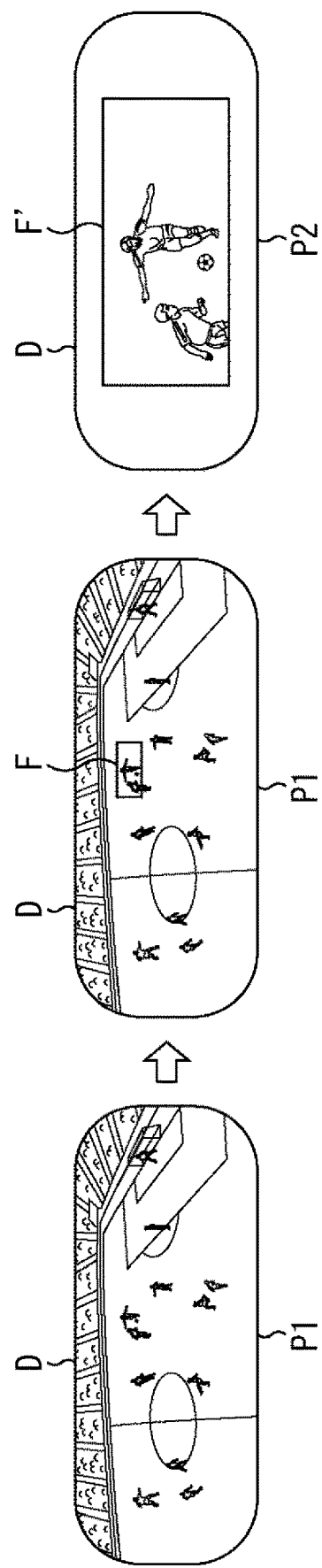
FIG. 1 is a diagram illustrating an outline of the present disclosure.

Hereinafter, preferred embodiments of the present disclosure will be described in detail with reference to the accompanying drawings. It is to be noted that in the present specification and the drawings, components having substantially the same functional configuration are designated by the same reference numerals to omit duplicate description.

Hereinafter, modes for carrying out the present technology will be described. The description will be given in the following order.

1. Outline of the present disclosure
2. First embodiment
3. Application example of first embodiment
4. Second embodiment
5. Example to be performed by software <<1. Outline of the Present Disclosure>>

The present disclosure intends to switch between a wide angle of view video and a planar video that is a part of the wide angle of view video without a sense of incongruity for viewing.

Therefore, first, the outline of the present disclosure will be described.

A user wears a head mounted display (HMD) on the head, and a wide angle of view video is displayed according to movements of the user's head. Consideration is given to a configuration in which, for example, as shown in the left part of FIG. 1, a wide angle of view video P1 including a relayed video of football game is displayed on a display unit C of the head mounted display (HMD).

In such a configuration, the wide angle of view video P1 in the left part of FIG. 1 is, in some cases, switched to a planar video P2 as shown in the right part of FIG. 1 to enlarge and display an area F' where two players including a player keeping a ball and a player of the opponent team who is marking the player are present in the wide angle of view video P1.

It is to be noted that the wide angle of view video P1 is a video that has been captured by a first camera for capturing a wide angle of view video, and the planar video P2 is a video that has an angle of view within the wide angle of view video P1 and that has been captured by a second camera, which is different from the first camera and which captures a video having a narrower angle of view than that of the video P1.

However, in a case where the wide angle of view video P1 as shown in the left part of FIG. 1 is suddenly switched to the planar video P2 as shown in the right part of FIG. 1 at a predetermined timing, the user who views the video displayed on the display unit D can recognize that the video that the user is viewing has been switched.

However, the user may not be able to recognize what positional relationship the planar video P2 to be displayed after switching has with respect to an immediately previous the wide angle of view video P1, and may feel a sense of incongruity.

Therefore, in the present disclosure, as shown in the central part of FIG. 1, an area corresponding to an area F', which becomes the planar video P2 to be switched to neat, is displayed as a frame F in the wide angle of view video P1.

Then, in the present disclosure, the wide angle of view video P1, to which the frame F has been added as shown in the central part of FIG. 1 to the wide angle of view video P1 in the left part of FIG. 1, is displayed, and is then switched to the planar video P2 shown in the right part of FIG. 1.

In this manner, at the timing immediately before the wide angle of view video P1 is switched to the planar video P2 to be displayed, a position corresponding to the planar video P2 is displayed as the frame F in the wide angle of view video P1. This configuration makes the user recognize that the planar video P2 to be switched to at the next timing corresponds to a video at which position in the wide angle of view video P1 immediately before switching, and then switches the video.

Consequently, the user viewing the display unit D recognizes the frame F displayed in the wide angle of view video P1, so as to be able to view the planar video P2 after switching while recognizing the positional relationship between the planar video P2 to be switched to next and the wide angle of view video P1 immediately before the switching.

As a result, the user can continue viewing without a sense of incongruity when the wide angle of view video P1 is switched to the planar video P2.

<<2. First Embodiment>>

Next, a configuration example of a reproducing system in a first embodiment of the present disclosure will be described with reference to a block diagram of FIG. 2.

In switching between a wide angle of view video and a planar video that is a partial video in the wide angle of view video, the reproducing system according to the present disclosure displays the position of the planar video to be switched to next as a frame in the wide angle of view video, and then switches to the planar video, so as to switch between the videos without a sense of incongruity.

Figure 2:
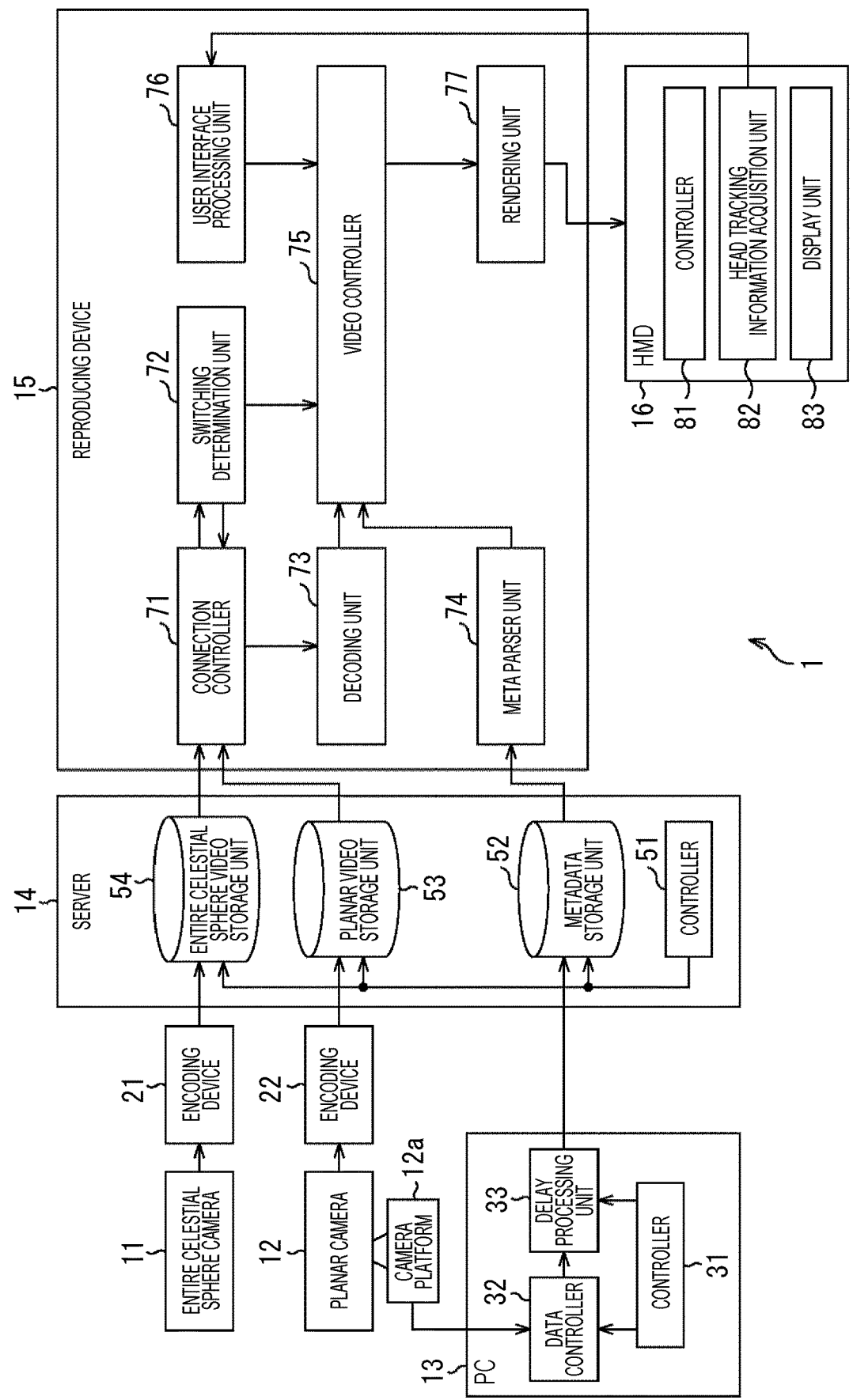
FIG. 2 is a diagram illustrating a configuration example of a reproducing system in a first embodiment of the present disclosure.

A reproducing system 1 of FIG. 2 includes an entire celestial sphere camera 11, a planar camera 12, a personal computer (PC) 13, a server 14, a reproducing device 15, a head mounted display (HMD) 16, and encoding devices 21 and 22.

The reproducing system 1 of FIG. 2 is a system that relays and distributes contents, for example, sports, plays, and the like from a venue, and the entire celestial sphere camera 11, the planar camera 12, and the personal computer (PC) 13 are configured as venue facilities of a sport facility, a theater, or the like.

In addition, the reproducing device 15 and the HMD 16 are configured as facilities on a user's side that receives content distribution.

Then, the server 14 acquires a video as a content from the venue facilities via a network, and distributes the video to the facilities on the user's side.

The entire celestial sphere camera 11 is a camera installed in a fixed state, and captures an entire celestial sphere video including a wide angle of view video having a range of 180 degrees, a range of 360 degrees, or the like with respect to the horizontal direction and the vertical direction, and outputs the video to the encoding device 21. The encoding device 21 encodes the entire celestial sphere video, and outputs the entire celestial sphere video that has been encoded to the server 14. It is to be noted that the entire celestial sphere camera 11 may have a function of the encoding device 21 so as to encode the captured entire celestial sphere video, and may output the entire celestial sphere video that has been encoded to the server 14. Further, the entire celestial sphere video that has been captured by the entire celestial sphere camera 11 is encoded by the encoding device 21, and is then output to the server 14. However, in the following description, the process of encoding, by the encoding device 21, the entire celestial sphere video is omitted as necessary, and, for example, will be described as "the entire celestial sphere camera 11 outputs the entire celestial sphere video that has been captured to the server 14". However, only the expression is omitted, and in reality, the entire celestial sphere video that has been captured by the entire celestial sphere camera 11 is encoded by the encoding device 21, and is then output to the server 14.

The planar camera 12 is a camera provided on a camera platform 12a, and captures a partial range of a range captured by the entire celestial sphere camera 11 as a planar video, for example, with a horizontal vertical ratio of 16:9, while changing a video-capturing position and pan-tilt using the camera platform 12a, and outputs the planar video to the encoding device 22. The encoding device 22 encodes the entire celestial sphere video, and outputs the entire celestial sphere video that has been encoded video to the server 14. It is to be noted that the planar camera 12 may have the function of the encoding device 22 to encode the planar video that has been captured, and may output the planar video that has been encoded to the server 14. Further, the planar video that has been captured by the planar camera 12 is encoded by the encoding device 22, and is then output to the server 14. However, in the following description, the process of encoding, by the encoding device 22, the planar video is omitted as necessary, and will be simply described as "the planar camera 12 outputs the planar video that has been captured to the server 14". However, only the expression is omitted, and in reality, the planar video that has been captured by the planar camera 12 is encoded by the encoding device 22, and is then output to the server 14.

Further, in the present disclosure, the description will be given with regard to an example in which an entire celestial sphere video and a planar video including a partial video of the entire celestial sphere video are respectively captured by the entire celestial sphere camera 11 and the planar camera 12. However, a configuration other than the entire celestial sphere camera 11 and the planar camera 12 may be used, as long as such a configuration is capable of capturing a wide angle of view video and a planar video including a partial video that is a part of the entire celestial sphere video.

The camera platform 12a outputs information indicating the video-capturing position and a pan-tilt direction of the planar camera 12, as pan-tilt information, to the PC 13.

The PC 13 acquires the pan-tilt information supplied from the camera platform 12a of the planar camera 12, generates metadata on the basis of the pan-tilt information, and outputs the metadata to the server 14.

More specifically, the PC 13 includes a controller 31, a data controller 32, and a delay processing unit 33.

The controller 31 includes a processor, a memory, and the like, and controls the entire operation of the PC 13, and controls the data controller 32 and the delay processing unit 33.

The data controller 32 generates metadata including the pan-tilt information on the basis of the pan-tilt information supplied from the camera platform 12a, and outputs the metadata to the delay processing unit 33.

The delay processing unit 33 temporarily stores the metadata supplied from the data controller 32, delays by a predetermined period so as to adjust the timing to match the timing when the planar video that has been captured by the planar camera 12 is output to the server 14, and outputs the metadata to the server 14.

That is, the planar video output from the planar camera 12 to the server 14 and the metadata including the pan-tilt information of the planar camera 12, which is capturing the planar video, are supplied to the server 14 at the same timing.

The server 14 receives and stores the entire celestial sphere video supplied from the entire celestial sphere camera 11, the planar video supplied from the planar camera 12, and the metadata supplied from the PC 13, and in addition, outputs the entire celestial sphere video, the planar video, and the metadata to the reproducing device 15.

More specifically, the server 14 includes a controller 51, a metadata storage unit 52, a planar video storage unit 53, and an entire celestial sphere video storage unit 54.

The controller 51 includes a processor, a memory, and the like, and controls the entire operation of the server 14.

The controller 51 controls the operations of the metadata storage unit 52, the planar video storage unit 53, and the entire celestial sphere video storage unit 54.

When the metadata is supplied from the PC 13, the controller 51 acquires the metadata, and causes the metadata storage unit 52 to store the metadata. Further, the controller 51 reads the metadata stored in the metadata storage unit 52, and transmits the metadata to the reproducing device 15.

When the planar video is supplied from the planar camera 12, the controller 51 acquires the planar video, and causes the planar video storage unit 53 to store the planar video. Further, the controller 51 reads the planar video stored in the planar video storage unit 53, and transmits the planar video to the reproducing device 15.

When the entire celestial sphere video is supplied from the entire celestial sphere camera 11, the controller 51 acquires the entire celestial sphere video, and causes the entire celestial sphere video storage unit 54 to store the entire celestial sphere video. Further, the controller 51 reads the entire celestial sphere video stored in the entire celestial sphere video storage unit 54, and transmits the entire celestial sphere video to the reproducing device 15.

The reproducing device 15 acquires the entire celestial sphere video, the planar video, and the metadata supplied from the server 14, performs rendering on the basis of head tracking information from the HMD 16 worn by the user, and outputs the videos to the HMD 16 for display.

The reproducing device 15 causes the HMD 16 to display the entire celestial sphere video in a case where the line quality is good, and causes the HMD 16 to display the planar video in a case where the line quality is degraded, depending on the line quality of the communication line with the server 14.

In such a situation, in switching from the entire celestial sphere video to the planar video, the reproducing device 15 displays the range of the planar video to be switched to next as a frame in the entire celestial sphere video, so as to display that the planar video to be switched to next is at which position in the entire celestial sphere video, and then switches to the planar video and displays the planar video.

By switching from the entire celestial sphere video to the planar video in this manner, the user can view the video switched from the entire celestial sphere video to the planar video without a sense of incongruity.

It is to be noted that when the planar video is switched to the entire celestial sphere video, the frame indicating the range of the planar video is displayed in the entire celestial sphere video for a predetermined period at the timing of switching to the entire celestial sphere video.

By switching from the planar video to the entire celestial sphere video in this manner, the user can view the video switched from the planar video to the entire celestial sphere video without a sense of incongruity.

More specifically, the reproducing device 15 includes a connection controller 71, a switching determination unit 72, a decoding unit 73, a meta parser unit 74, a video controller 75, a user interface processing unit 76, and a rendering unit 77.

The connection controller 71 acquires the entire celestial sphere video and the planar video from the server 14, and outputs the videos to the decoding unit 73.

In such a situation, the connection controller 71 outputs to the switching determination unit 72, information indicating the line quality of the line for acquiring the entire celestial sphere video from the server 14, for example, information regarding the line speed, information regarding a remaining amount of buffer data of the entire celestial sphere video and the planar video that are being received, and the like.

On the basis of the information indicating the line quality supplied from the connection controller 71, the switching determination unit 72 supplies the video controller 75 with switching determination information for instructing displaying of the entire celestial sphere video on the HMD 16, in a case where, for example, the line quality such as the line speed is faster than a predetermined line speed and is better than a predetermined quality. Further, in a case where the information indicating the line quality is the information regarding the remaining amount of the buffer data of the entire celestial sphere video and the planar video that are being received, when the remaining amount of the buffer data is equal to or more than a predetermined threshold, the switching determination unit 72 may determine than the line quality is better than the predetermined quality and may instruct displaying of the entire celestial sphere video on the HMD 16.

In addition, in a case where the line quality is not better than the predetermined quality, the switching determination unit 72 supplies the video controller 75 with switching determination information for instructing displaying of the planar video on the HMD 16.

The decoding unit 73 decodes the entire celestial sphere video and the planar video, and outputs the videos to the video controller 75.

The meta parser unit 74 acquires the metadata supplied from the server 14, and outputs the metadata to the video controller 75.

The user interface processing unit 76 acquires the head tracking information supplied from the HMD 16, and outputs the head tracking information to the video controller 75.

The head tracking information is, for example, information regarding the position and the direction of the HMD 16 worn on the user's head, and is information indicating at which position and in which direction the user is facing.

The video controller 75 determines a video on the basis of the switching determination information supplied from the switching determination unit 72, the entire celestial sphere video and the planar video supplied from the decoding unit 73, the metadata supplied from the meta parser unit 74, and the head tracking information supplied from the user interface processing unit 76, and outputs the determined video to the rendering unit 77.

The rendering unit 77 renders the video supplied from the video controller 75, outputs the video that has been rendered to the HMD 16 for display.

The HMD 16 is a display device worn on the user's head, and displays the video supplied from the reproducing device 15.

More specifically, the HMD 16 includes a controller 81, a head tracking information acquisition unit 82, and a display unit 63.

The controller 81 includes a processor and a memory, and controls the entire operation of the HMD 16.

The head tracking information acquisition unit 82 includes, for example, a motion sensor or the like, acquires information regarding the position, the direction of the user's head, and the like as the head tracking information, and transmits the head tracking information to the reproducing device 15.

The display unit 83 includes a liquid crystal display (LCD) and an organic electro luminescence (EL), is provided in a viewing direction of the user wearing the END 16, and displays the video supplied from the reproducing device 15.

<Entire Celestial Sphere Video Capture Process>

Figure 3:
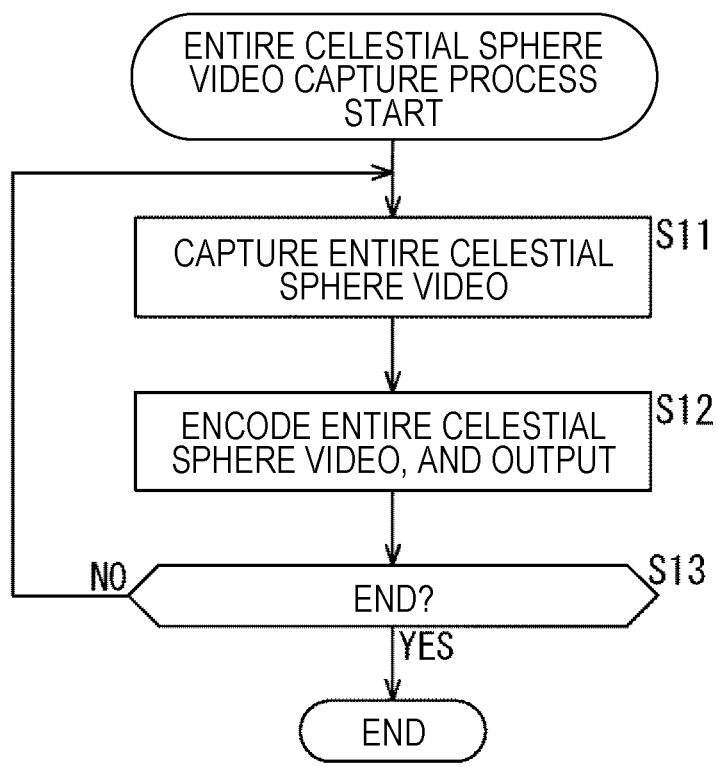
FIG. 3 is a flowchart illustrating an entire celestial sphere video capture process by an entire celestial sphere camera of FIG. 2.

Next, an entire celestial sphere video capture process by the entire celestial sphere camera 11 will be described with reference to a flowchart of FIG. 3.

In step S11, the entire celestial sphere camera 11 captures an entire celestial sphere video, and outputs the entire celestial sphere video to the encoding device 21.

In step S12, the encoding device 21 encodes the entire celestial sphere video that has been supplied from the entire celestial sphere camera 11, and transmits the entire celestial sphere video that has bees encoded to the server 14.

In step S13, the entire celestial sphere camera 11 determines whether or not the end of the process has been instructed. In a case where the end has not been instructed, the process returns to step S11, and the subsequent processes are repeated.

Then, in step S13, in a case where the end of the process has been instructed, the process ends.

By the above process, the entire celestial sphere video is captured by the entire celestial sphere camera 11, is encoded by the encoding device 21, and is continuously transmitted to the server 14.

<Planar Video Capture Process>

Figure 4:
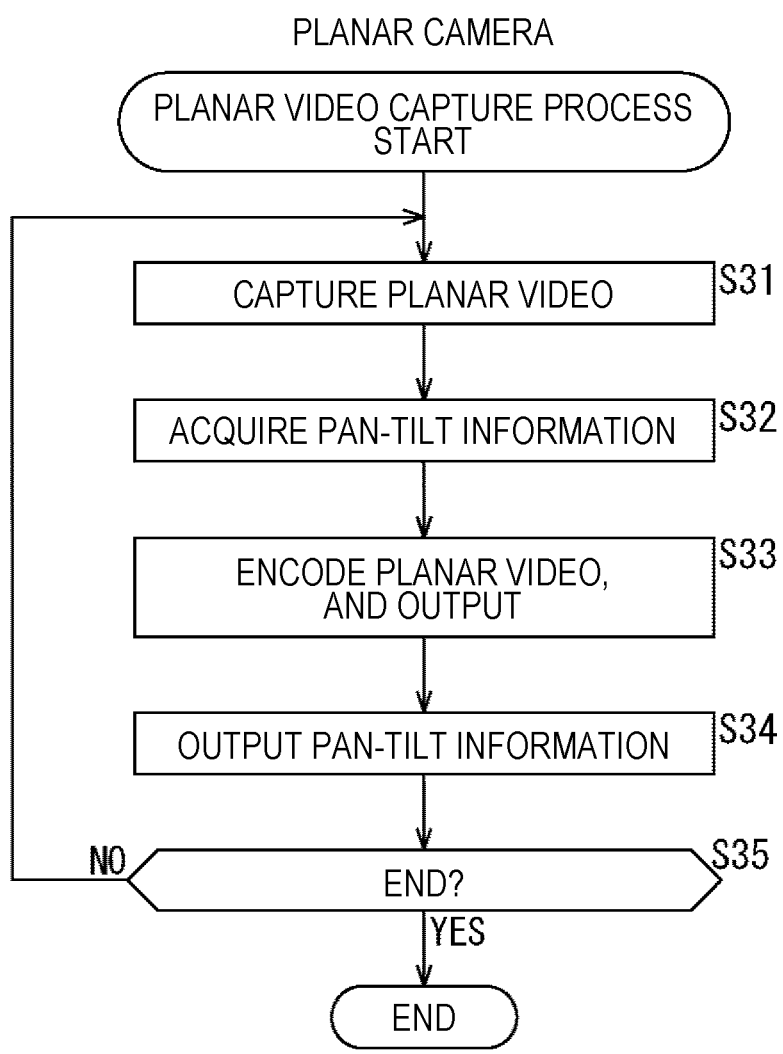
FIG. 4 is a flowchart illustrating a planar video capture process by a planar camera of FIG. 2.

Next, a planar video capture process by the planar camera 12 will be described with reference to a flowchart of FIG. 4.

In step S31, the planar camera. 12 captures a planar video including a partial video of the entire celestial sphere video captured by the entire celestial sphere camera 11, and outputs the planar video to the encoding device 22.

In step S32, the camera platform 12a of the planar camera 12 acquires the pan-tilt information including the information regarding the video-capturing position and pan-tilt that is a video-capturing direction of the planar camera 12.

In step S33, the encoding device 22 encodes the planar video that has been captured, and outputs the planar video that has been encoded to the server 14.

In step S34, the camera platform 12a outputs the pan-tilt information to the PC 13.

In step S35, the planar camera 12 determines whether or not the end of the process has been instructed. In a case were the end has not been instructed, the process returns to step S31, and the subsequent processes are repeated.

Then, in step S35, in a case where the end of the process has been instructed, the process ends.

By the above process, the planar video is captured by the planar camera 12, is encoded by the encoding device 22, and is transmitted to the server 14, and in addition, the pan-tilt information including the video-capturing position and the information regarding the pan-tilt of the planar camera 12 at the timing when the planar video is captured is output to the PC13.

<Metadata Generation Process by PC in FIG. 2>

Next, the metadata generation process by the PC 13 in FIG. 2 will be described with reference to a flowchart of FIG. 5.

In step S51, the data controller 32 acquires the pan-tilt information supplied from the camera platform 12*a* of the planar camera 12.

In step S52, the data controller 32 generates metadata on the basis of the pan-tilt information that has been acquired, and outputs the metadata to the delay processing unit 33.

In step S53, the delay processing unit 33 acquires the metadata supplied from the data controller 32, stores the metadata until the timing when the corresponding planar video in the planar camera 12 is transmitted to the server 14, and delays the output.

In step S54, the delay processing unit 33 outputs the metadata to the server 14 at the timing when the planar video corresponding to the pan-tilt information included in the metadata that is stored is transmitted to the server 14.

In step S55, the controller 31 determines whether or not the end of the process has been instructed. In a case where the end has not been instructed, the process returns to step S51, and the subsequent processes are repeated.

Then, in step S55, in a case where the end of the process has been instructed, the process ends.

By the above process, the metadata based on the pan-tilt information including the video-capturing position and the information regarding the pan-tilt at the timing when the planar video is captured by the planar camera 12 is generated, and in addition, the metadata is output to the server 14 at the timing when the corresponding planar video is transmitted to the server 14.

As a result, the planar video and the metadata including the corresponding pan-tilt information are adjusted at the same timing to be transmitted to the server 14.

<Video Transmission Process by Server in FIG. 2>

Next, a video transmission process by the server 14 of FIG. 2 will be described with reference to a flowchart of FIG. 6.

In step S71, the controller 51 of the server 14 acquires the entire celestial sphere video that has been captured by the entire celestial sphere camera 11 and that has been encoded by the encoding device 21, and causes the entire celestial sphere video storage unit 54 to store the entire celestial sphere video.

In step S72, the controller 51 reads the entire celestial sphere video that is stored in the entire celestial sphere video storage unit 54, and outputs the entire celestial sphere video to the reproducing device 15.

In step S73, the controller 51 acquires a planar video that has been captured by the planar camera 12 and that has been encoded by the encoding device 22, and causes the planar video storage unit 53 to store the planar video.

In step S74, the controller 51 reads the planar video that is stored in the planar video storage unit 53, and outputs the planar video to the reproducing device 15.

In step S75, the controller 51 acquires the metadata supplied from the PC 13, and causes the metadata storage unit 52 to store the metadata.

In step S76, the controller 51 reads the metadata that is stored in the metadata storage unit 52, and outputs the metadata to the reproducing device 15.

In step S77, the controller 51 determines whether or not the end of the process has been instructed. In a case where the end has not been instructed, the process returns to step S71, and the subsequent processes are repeated.

Then, in step S77, in a case where the end of the process has been instructed, the process ends.

By the above process, the entire celestial sphere video that has been captured by the entire celestial sphere camera 11 and that has been encoded by the encoding device 21, the planar video that has been captured by the planar camera 12 and that has been encoded by the encoding device 22, and the metadata that has been generated by the PC 13 are respectively transmitted to the reproducing device 15.

In such a situation, regarding the entire celestial sphere video, the planar video, and the metadata, respectively corresponding pieces of information at the same timing are supplied to the reproducing device 15.

Figure 6:
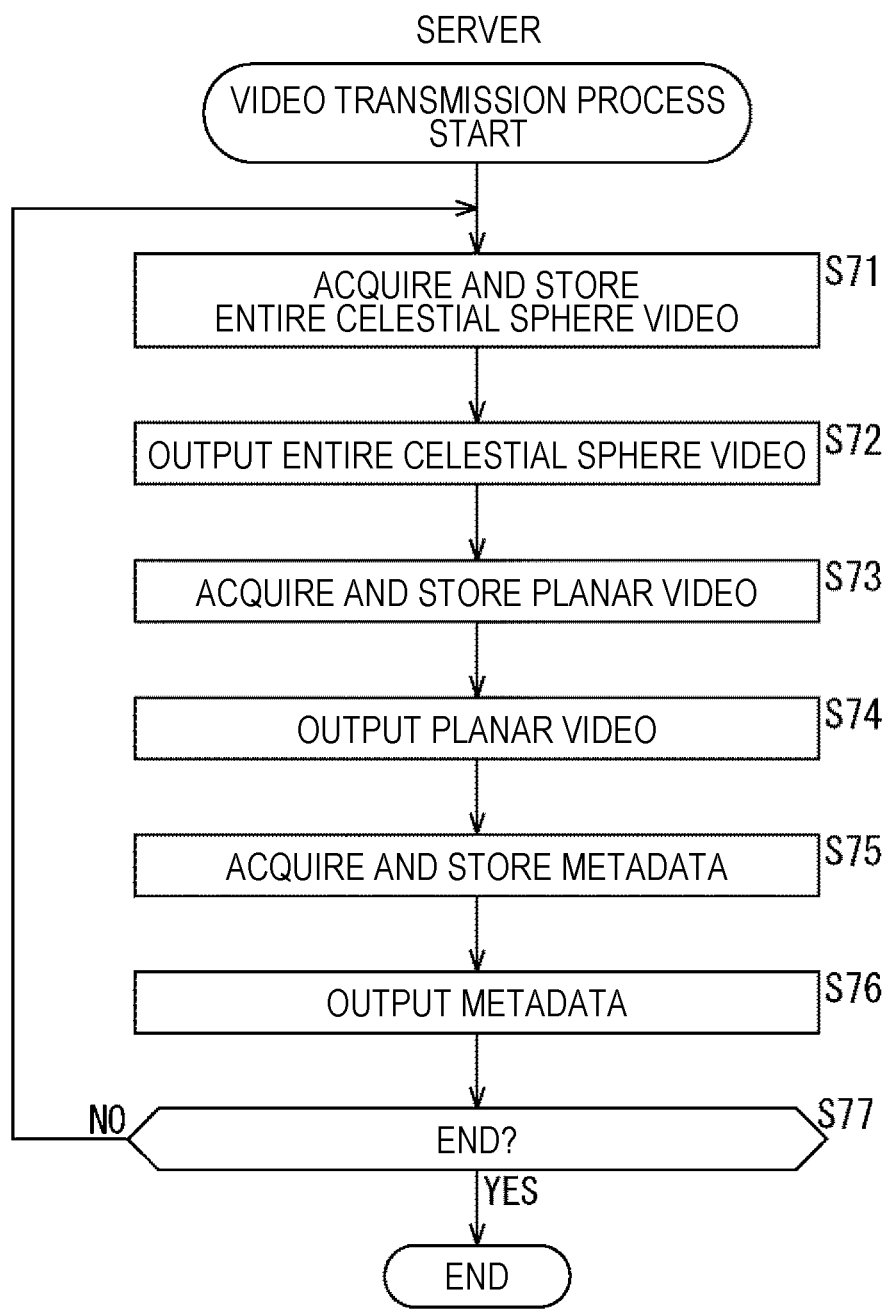
FIG. 6 is a flowchart illustrating a video transmission process by a server of FIG. 2.

Therefore, the processes of steps S71 and S72, the processes of steps S73 and S74, and the processes of steps S75 and S76 in the flowchart of FIG. 6 are substantially parallel processes.

<Reproduction Process by Reproducing Device in FIG. 2>

Next, a reproduction process by the reproducing device 15 of FIG. 2 will be described with reference to the flowchart of FIG. 7.

In step S111, the connection controller 71 acquires the entire celestial sphere video and the planar video that are encoded from the server 14, and outputs the videos to the decoding unit 73.

In step S112, the decoding unit 73 decodes the entire celestial sphere video and the planar video that are encoded and that have been supplied from the connection controller 71, and outputs the videos that have been decoded to the video controller 75. That is, the video controller 75 acquires the entire celestial sphere video and the planar video that have been decoded.

In step S113, the meta parser unit 74 acquires the metadata supplied from the server 14, and outputs the metadata to the video controller 75. That is, the video controller 75 acquires the metadata.

In step S114, the video controller 75 acquires head tracking information from the HMD 16.

In step S115, the connection controller 71 outputs to the switching determination unit 72, information regarding, for example, the line speed and the remaining amount of the buffer data of the entire celestial sphere video and the planar video that are being received, as the information regarding the line quality of the entire celestial sphere video from the server 14. That is, the switching determination unit 72 acquires the information regarding the line speed and the remaining amount of the buffer data of the videos, as the information regarding the line quality.

In step S116, the switching determination unit 72 determines whether or not the line speed is faster than a predetermined speed and whether or not the remaining amount of the buffer data is equal to or larger than a predetermined threshold on the basis of the information regarding the line quality including the line speed or the remaining amount of the buffer data of the entire celestial sphere video and the planar video that are being received, so as to determine whether or not the line quality is sufficient to be capable of reproducing the entire celestial sphere video, that is, whether or not to reproduce the entire celestial sphere video.

In a case where it is determined in step S116 that the line quality is sufficient to reproduce the entire celestial sphere video, the switching determination unit 72 outputs the switching determination information for instructing reproduction of the entire celestial sphere video to the video controller 75. The process proceeds to step S117.

In step S117, the video controller 75 selects the entire celestial sphere video that has been decoded on the basis of the switching determination information for instructing the reproduction of the entire celestial sphere video and the head tracking information, and outputs the entire celestial sphere video that has been selected to the rendering unit 77.

In step S118, the rendering unit 77 renders the entire celestial sphere video that has been supplied from the reproducing device 15, and outputs the entire celestial sphere video that has been rendered to the HMD 16 for display.

In step S119, the video controller 75 determines whether or not the end of the process has been instructed. In a case where the end has not been instructed, the process returns to step S111, and the subsequent processes are repeated.

Then, in step S119, in a case where it is determined that the end has been instructed, the process ends.

On the other hand, in a case where it is determined in step S116 that the line quality is not sufficient to reproduce the entire celestial sphere video, the switching determination unit 72 outputs the switching determination information for instructing the reproduction of the planar video to the video controller 75 and the process proceeds to step S120.

In step S120, the video controller 75 reads the pan-tilt information indicating the video-capturing position and the direction of the planar camera 12 included in the metadata on the basis of the switching determination information, identifies the position of the planar video in the entire celestial sphere video, and sets a display position and a size of a frame indicating the corresponding position in the entire celestial sphere video.

In step S121, the video controller 75 generates the entire celestial sphere video, to which a frame indicating the position and the size corresponding to the planar video has been added on the basis of the head tracking information, the entire celestial sphere video that has been decoded, and the information regarding the position and the size of the frame, and outputs the entire celestial sphere video with the frame to the rendering unit 77.

In step S122, the rendering unit 77 renders the entire celestial sphere video with the frame indicating the position and the size corresponding to the planar video, outputs the entire celestial sphere video with the frame to the HMD 16 for display.

In step S123, the video controller 75 generates a transition video for transitioning from the entire celestial sphere video to the planar video.

The transition video for transitioning from the entire celestial sphere video to the planar video is, for example, a video in a process of gradually enlarging an area in the planar video displayed as the frame in the entire celestial sphere video and transitioning to the planar video. The entire celestial sphere video and the planar video are used for, for example, interpolation generation.

In step S124, the rendering unit 77 renders the transition video for transitioning from the entire celestial sphere video to the planar video, and outputs the transition video to the HMD 16 for display.

In step S125, the video controller 75 outputs the planar video that has been decoded to the rendering unit 77.

In step S126, the rendering unit 77 renders the planar video, and outputs the planar video to the HMD 16 for display.

That is, by the processes of steps S120 to S126, in the HMD16, after the frame indicating the corresponding position of the planar video is added and the entire celestial sphere video is displayed, the transition video for transitioning to the planar video is displayed, and is then switched to displaying of the planar video.

In step S127, the connection controller 71 acquires the entire celestial sphere video and the planar video from the server 14, and outputs the videos to the decoding unit 73.

In step S128, the decoding unit 73 decodes the entire celestial sphere video and the planar video that have been supplied from the connection controller 71, and outputs the entire celestial sphere video and the planar video that have been decoded to the video controller 75. That is, the video controller 75 acquires the entire celestial sphere video and the planar video that have been decoded.

In step S129, the meta parser unit 74 acquires the metadata supplied from the server 14, and outputs the metadata to the video controller 75. That is, the video controller 75 acquires the metadata.

In step S130, the video controller 75 acquires the head tracking information from the HMD 16.

In step S131, the connection controller 71 outputs to the switching determination unit 72, the information regarding, for example, the line speed or the remaining amount of the buffer data of the entire celestial sphere video and the planar video that are being received, as the information regarding the line quality of the entire celestial sphere video from the server 14. That is, the connection controller 71 acquires the information regarding the line speed or the remaining amount of the buffer data of the videos, as the information regarding the line quality.

In step S132, the switching determination unit 72 determines whether or not the line quality is sufficient to be capable of reproducing the entire celestial sphere video from the information regarding the line quality including the line speed and the remaining amount of the buffer data of the entire celestial sphere video and the planar video that are being received, that is, whether or not to reproduce the entire celestial sphere video.

In a case where it is determined in step S132 that the line quality is not sufficient to reproduce the entire celestial sphere video, the switching determination unit 72 outputs the switching determination information for instructing the reproduction of the planar video to the video controller 75. The process proceeds to step S133.

In step S133, the video controller 75 determines whether or not the end of the process has been instructed. In a case where the end has not been instructed, the process returns to step S125, and the subsequent processes are repeated.

Then, in step S133, in a case where it is determined that the end has been instructed, the process ends.

That is, is a case where a state in which the sufficient line quality for reproducing the entire celestial sphere video cannot be obtained continues, the processes of steps S125 to S133 are repeated, and the planar video is continuously rendered and displayed on the HMD 16.

Further, in step S132, in a case where it is determined that the line quality is sufficient to reproduce the entire celestial sphere video, the switching determination unit 72 outputs the switching determination information for instructing the reproduction of the entire celestial sphere video to the video controller 75. The process proceeds to step S134.

In step S134, the video controller 75 generates a transition video for transitioning from the planar video to the entire celestial sphere video, and outputs the transition video that has been generated to the rendering unit 77.

The transition video for transitioning from the planar video to the entire celestial sphere video is, for example, a video in a process of gradually shrinking the planar video to be embedded at the corresponding position and size in the entire celestial sphere video and transitioning to the entire celestial sphere video. The entire celestial sphere video and the planar video are used for, for example, interpolation generation.

In step S135, the rendering unit 77 outputs the transition video to the HMD 16 for display.

In step S136, the video controller 75 reads the pan-tilt information indicating the video-capturing position and the direction of the planar camera 12 included in the metadata, identifies the position of the planar video in the entire celestial sphere video, and sets the display position and the size of the frame indicating the corresponding position in the entire celestial sphere video.

In step S137, the video controller 75 generates the entire celestial sphere video, to which the frame indicating the position and the size corresponding to the planar video has been added on the basis of the head tracking information, the entire celestial sphere video that has been decoded, and the information regarding the position and the size of the frame, and outputs the entire celestial sphere video with the frame to the rendering unit 77.

In step S138, the rendering unit 77 outputs the entire celestial sphere video to which the frame has been added to the HMD 16 for display. The process returns to step S117.

That is, by a reverse process of the case where the entire celestial sphere video transitions to the planar video, also when the planar video transitions to the entire celestial sphere video, the planar video transitions to the entire celestial sphere video, and then the frame corresponding to the planar video is temporarily displayed in the entire celestial sphere video so that the planar video at which position in the entire celestial sphere video having been displayed can be recognized.

It is to be noted that in the above, the description has been given with regard co an example in which the position and the size corresponding to the planar video to be switched to next in the entire celestial sphere video are represented by the display information including the frame F in FIG. 1, for example. However, the display information other than the frame may be applicable as long as the position and the size corresponding to the planar video to be switched to next in the entire celestial sphere video can be represented. For example, the corresponding area may be colored translucently, or only the corresponding area may be displayed as a black-and-white video.

In addition, depending on the direction of the user wearing the HMD16, there is no area of the planar video to be switched to next in the entire celestial sphere video in the user's field of view. Hence, there is a possibility that the frame indicating the position and the size corresponding to the planar video to be switched to next cannot be displayed.

In such a case, for example, switching from the entire celestial sphere video to the planar video may be waited until the frame indicating the position and the size corresponding to the planar video to be switched to next can be displayed in the user's field of view, and then the switching may be conducted.

Alternatively, in switching from the entire celestial sphere video to the planar video, a video in which the entirety of the entire celestial sphere video, to which a frame has been added, can be viewed is temporarily generated and displayed as a transition video, for example. After forcibly making the user view the video to which the frame has been added, the switching may be conducted by transitioning to the planar video.

Furthermore, in the above, the description has been given with regard to an example in which the line speed, which is the line quality of the entire celestial sphere video, or the remaining amount of the buffer data of the entire celestial sphere video and the planar video that are being received are used as a reference for switching between displaying of the entire celestial sphere video and displaying of the planar video. However, the switching may be conducted with another reference, for example, the switching may be conducted in response to a user's instruction, or may be conducted when displaying a predetermined specific scene according co a presentation or the like of a content.

<Display Process by HMD in FIG. 2>

Figure 8:
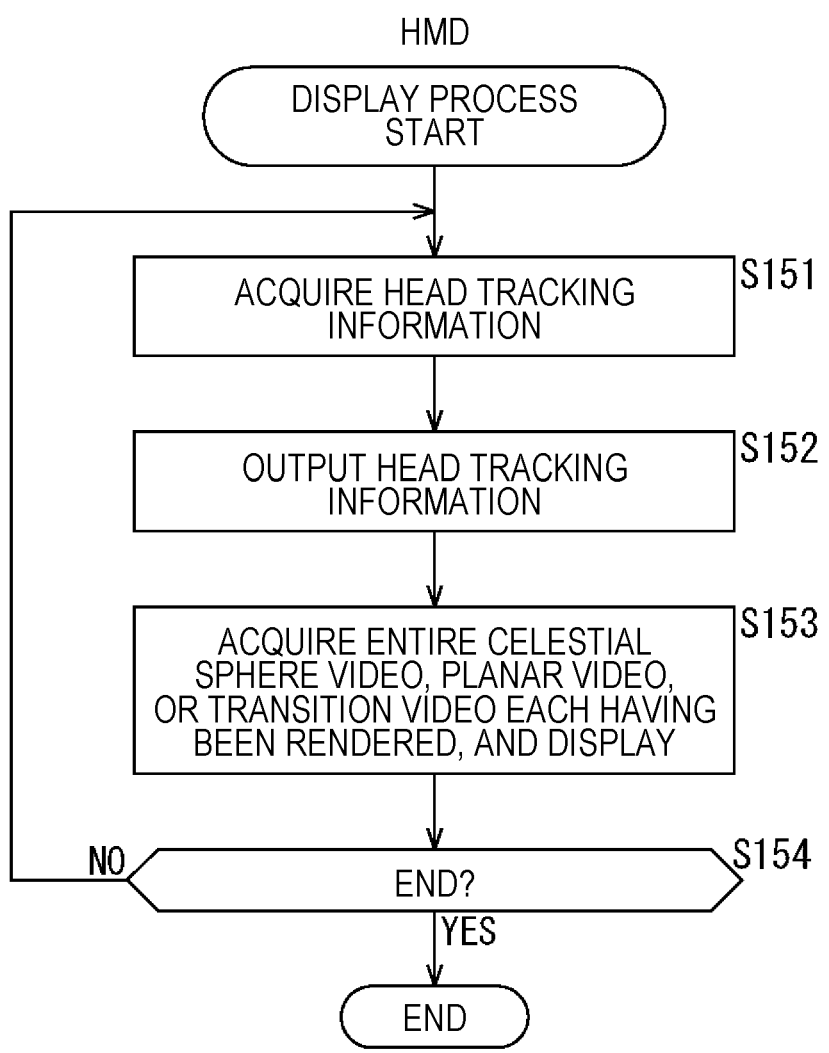
FIG. 8 is a flowchart illustrating a display process by an HMD of FIG. 2.

Next, a display process by the HMD 16 of FIG. 2 will be described with reference to a flowchart of FIG. 8.

In step S151, the head tracking information acquisition unit 82 of the HMD 16 acquires head tracking information of the user.

In step S152, the head tracking information acquisition unit 82 outputs the head tracking information that has been acquired to the reproducing device 15.

In step S153, the controller 81 acquires the entire celestial sphere video, the planar video, or the transition video supplied from the reproducing device 15, and causes the display unit 83 to display the videos.

In step S154, the controller 81 determines whether or not the end of the process has been instructed. In a case where the end has not been instructed, the process returns to step S151, and the subsequent processes are repeated.

Then, in step S154, in a case where it is determined that the end has been instructed, the process ends.

By the above series of processes, the head tracking information is acquired, and is continuously output to the reproducing device 15, and in addition, the entire celestial sphere video, the planar video, or the transition video supplied from the reproducing device 15 is acquired, and is displayed continuously on the display unit 83.

Consequently, the entire celestial sphere video or the planar video is switched and displayed according to the line quality. At the time of being switched, the frame located at the position and having the size of the corresponding planar video is displayed in the entire celestial sphere video. Further, the transition video is displayed, and is then switched to the planar video.

Therefore, even when the entire celestial sphere video is switched to the planar video, the user can recognize that the planar video at which position in the entire celestial sphere video has been switched to.

In addition, when the planar video is switched to the entire celestial sphere video, the transition video is displayed and then the entire celestial sphere video to which a frame has been added is displayed. This configuration enables recognition that the entire celestial sphere video has been switched from the planar video at which position in the entire celestial sphere video that has been switched to.

As a result, switching between the wide angle of view video and the planar video that is a part of the wide angle of view video is enabled without a sense of incongruity for viewing.

<<3. Application Example of First Embodiment>>

In the above, the description has been given with regard to an example in which the delay processing unit 33 of the PC 13 causes the planar camera 12 to capture the metadata including the pan-tilt information, and the timing with the planar video that has been encoded and output by the encoding device 21 is adjusted. However, the server 14 may generate time information indicating the timing of the planar video, may include the information in the metadata, and may output the metadata to the reproducing device 15.

With such a configuration, in the reproducing device 15, in selecting a planar video, the corresponding planar video and the metadata can be used according to the time information included in the metadata.

Figure 9:
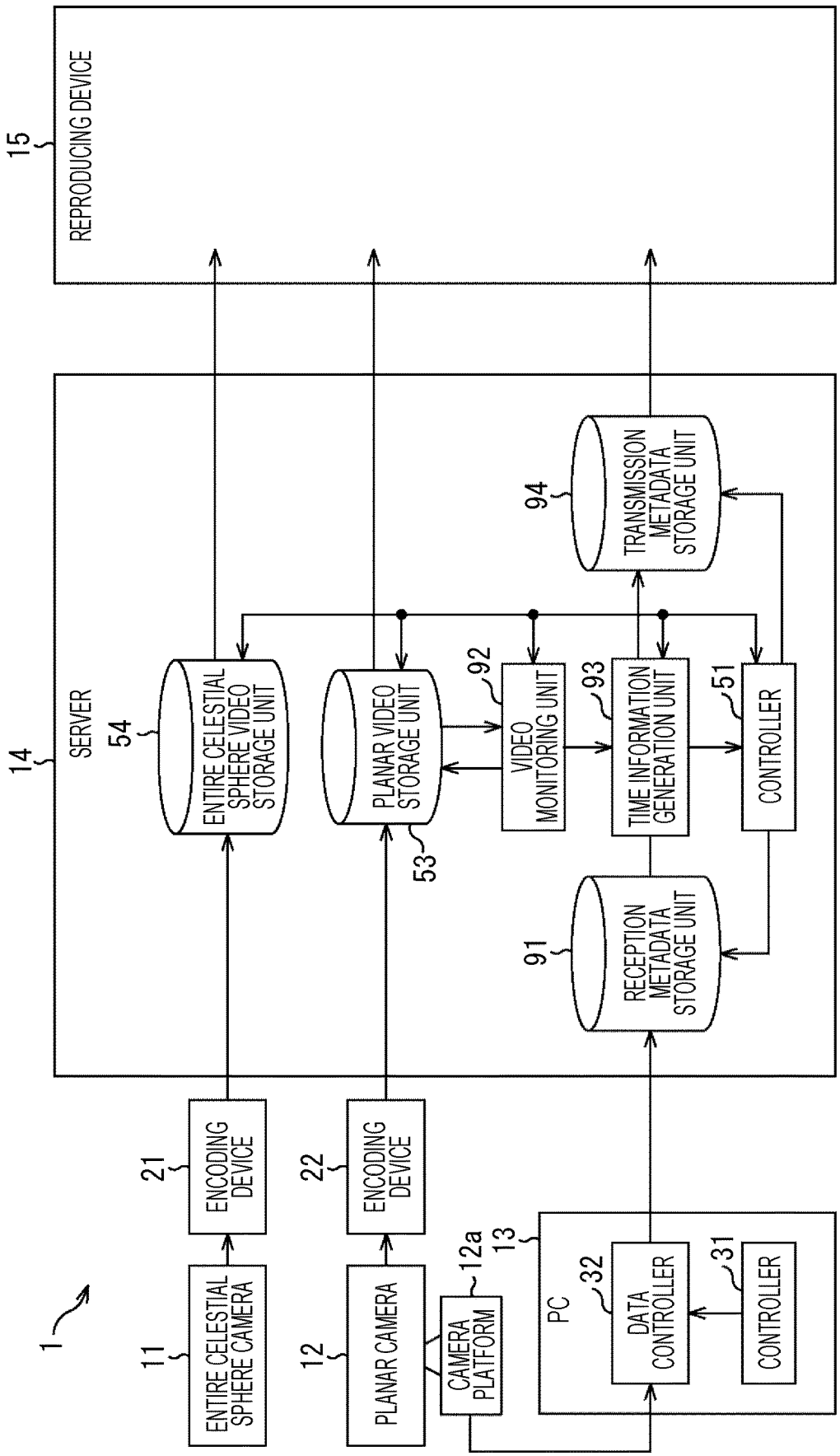
FIG. 9 is a diagram illustrating an application example of the reproducing system in the first embodiment of the present disclosure.

FIG. 9 shows a configuration example of the reproducing system 1 in which the server 14 generates the time information indicating the timing of the planar video, includes the time information in the metadata, and outputs the metadata to the reproducing device 15.

In the reproducing system 1 of FIG. 9, the delay processing unit 33 is omitted from the PC 13, and in addition, in the server 14, a reception metadata storage unit 91, a video monitoring unit 92, a time information generation unit 93, and a transmission metadata storage unit 94 are provided, instead of the metadata storage unit 52.

That is, in the PC 13 of FIG. 9, the metadata that has been generated is output to the server 14 without a delay adjustment. Therefore, in the PC 13, the delay processing unit 33 or the like can be omitted.

Further, the reception metadata storage unit 91 is controlled by the controller 51, and stores the metadata supplied from the PC 13, as reception metadata.

The video monitoring unit 92 monitors a timing when the planar video is stored in the planar video storage unit 53, and outputs a signal indicating the timing when the planar video is stored to the time information generation unit 93.

The time information generation unit 93 generates time information based on a signal indicating the timing when the planar video supplied from the video monitoring unit 92 is stored in the planar video storage unit 53, reads the reception metadata stored in the reception metadata storage unit 91, adds the time information that has been generated, and causes the transmission metadata storage unit 94 to store as transmission metadata.

Then, the controller 51 reads the transmission metadata stored in the transmission metadata storage unit 94, and outputs as metadata to the reproducing device 15.

In the reproducing device 15, in a case where a planar video is selected on the basis of the switching determination information, the pan-tilt information corresponding to the planar video can be used by selecting the metadata including the corresponding time information.

<Metadata Generation Process by PC in FIG. 9>

Next, a metadata generation process by the PC 13 of FIG. 9 will be described with reference to a flowchart of FIG. 10.

Figure 5:
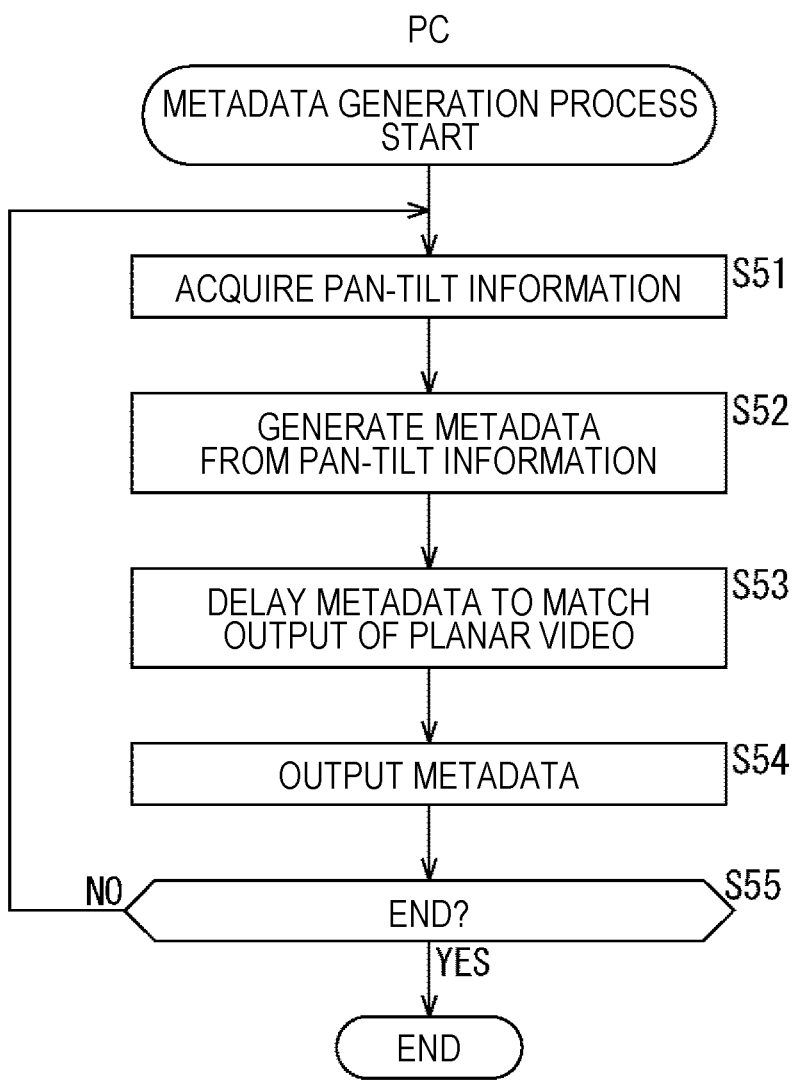
FIG. 5 is a flowchart illustrating a metadata generation process by a PC of FIG. 2.
Figure 10:
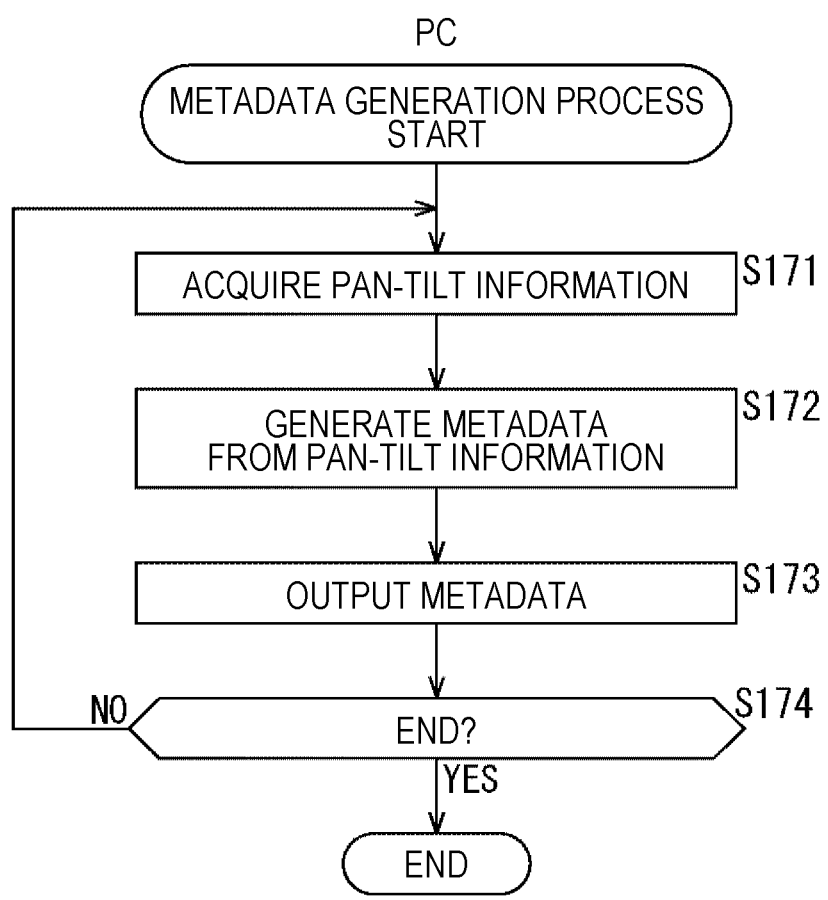
FIG. 10 is a flowchart illustrating a metadata generation process by a PC of FIG. 9.

It is to be noted that processes of steps S171 to S174 in the flowchart of FIG. 10 are similar to the processes of steps S51, S52, S54, and S55 of FIG. 5. Therefore, the descriptions thereof will be omitted.

That is, in the metadata generation process of FIG. 10, the delay process of the metadata by the delay processing unit 33 in step S53 in the metadata generation process of FIG. 5 is omitted.

As a result, the delay process by the delay processing unit 33 can be omitted.

<Video Transmission Process by Server in FIG. 9>

Figure 11:
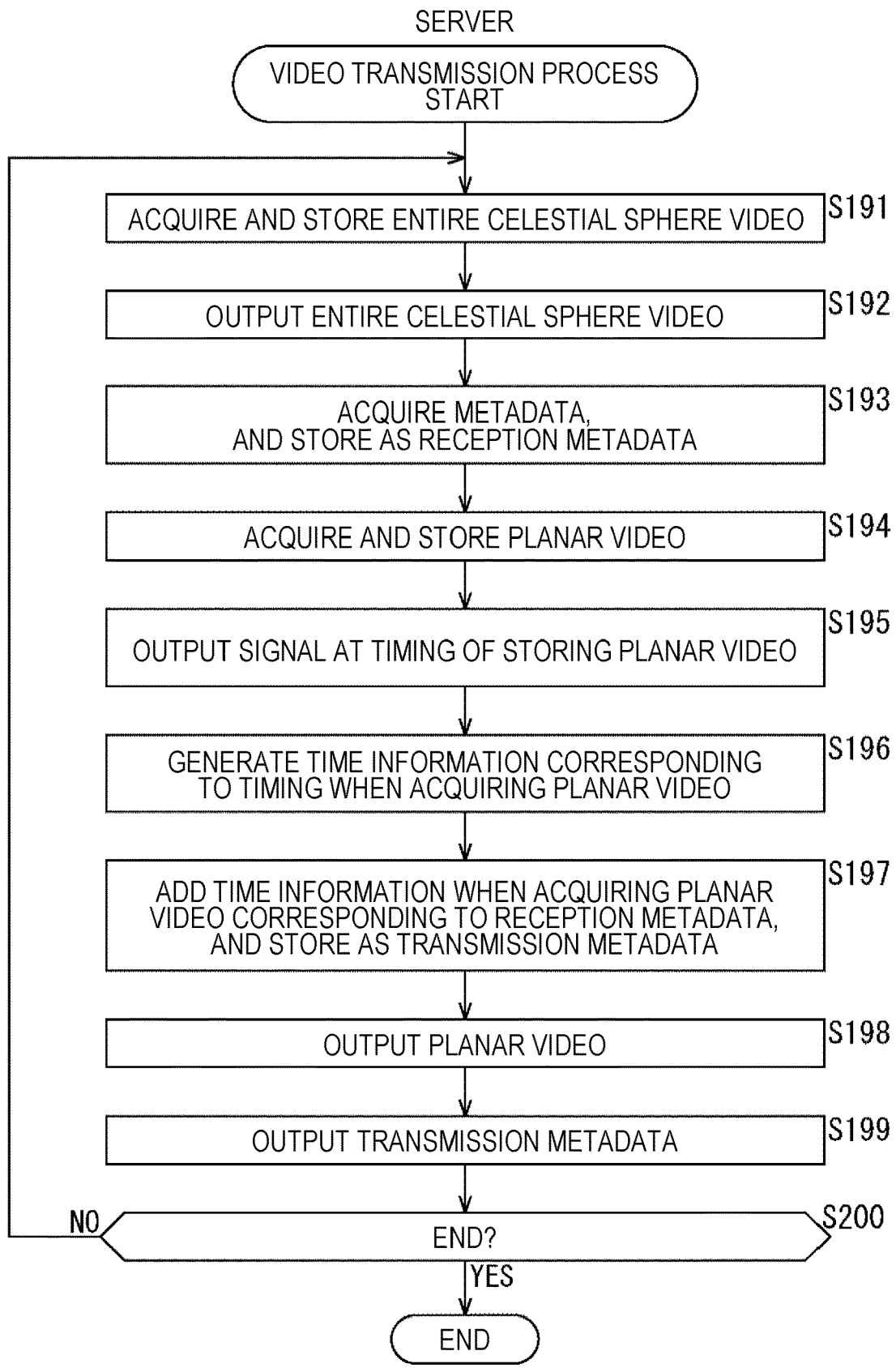
FIG. 11 is a flowchart illustrating a video transmission process by a server of FIG. 9.

Next, a video transmission process by the server 14 of FIG. 9 will be described with reference to a flowchart of FIG. 11.

In step S191, the controller 51 of the server 14 acquires the entire celestial sphere video that has been captured by the entire celestial sphere camera 11 and that has been encoded and supplied by the encoding device 21, and causes the entire celestial sphere video storage unit 54 to store the entire celestial sphere video.

In step S192, the controller 51 reads the entire celestial sphere video stored in the entire celestial sphere video storage unit 54, and outputs the entire celestial sphere video to the reproducing device 15.

In step S193, the controller 51 acquires the metadata supplied from the PC 13, and causes the reception metadata storage unit 91 to store as the reception metadata.

In step S194, the controller 51 acquires the planar video that has been captured by the planar camera 12 and that has been encoded and supplied by the encoding device 22, and causes the planar video storage unit 53 to store the planar video.

In step S195, the video monitoring unit 92 outputs, to the time information generation unit 93, a signal indicating a timing when the planar video that has been captured by the planar camera 12 and that has been encoded and supplied by the encoding device 22 is stored in the planar video storage unit 53.

In step S196, the time information generation unit 93 generates time information at the timing of receiving a signal supplied from the video monitoring unit 92.

In step S197, the time information generation unit 93 reads the reception metadata that has been stored in the reception metadata storage unit 91, adds the time information that has been generated, and causes the transmission metadata storage unit 94 to store as transmission metadata.

In step S198, the controller 51 reads the planar video stored in the planar video storage unit 53, and outputs the planar video to the reproducing device 15.

In step S199, the controller 51 reads the transmission metadata stored in the transmission metadata storage unit 94, and outputs the transmission metadata as metadata to the reproducing device 15.

In step S200, the controller 51 determines whether or not the end of the process has been instructed. In case where the end has not been instructed, the process returns to step S191, and the subsequent processes are repeated.

Then, in step S200, in a case where the end of the process has been instructed, the process ends.

By the above process, in addition to the entire celestial sphere video and the planar video, the metadata, to which the time information corresponding to the timing when the planar video is acquired has been added, is transmitted to the reproducing device 15.

Figure 7:
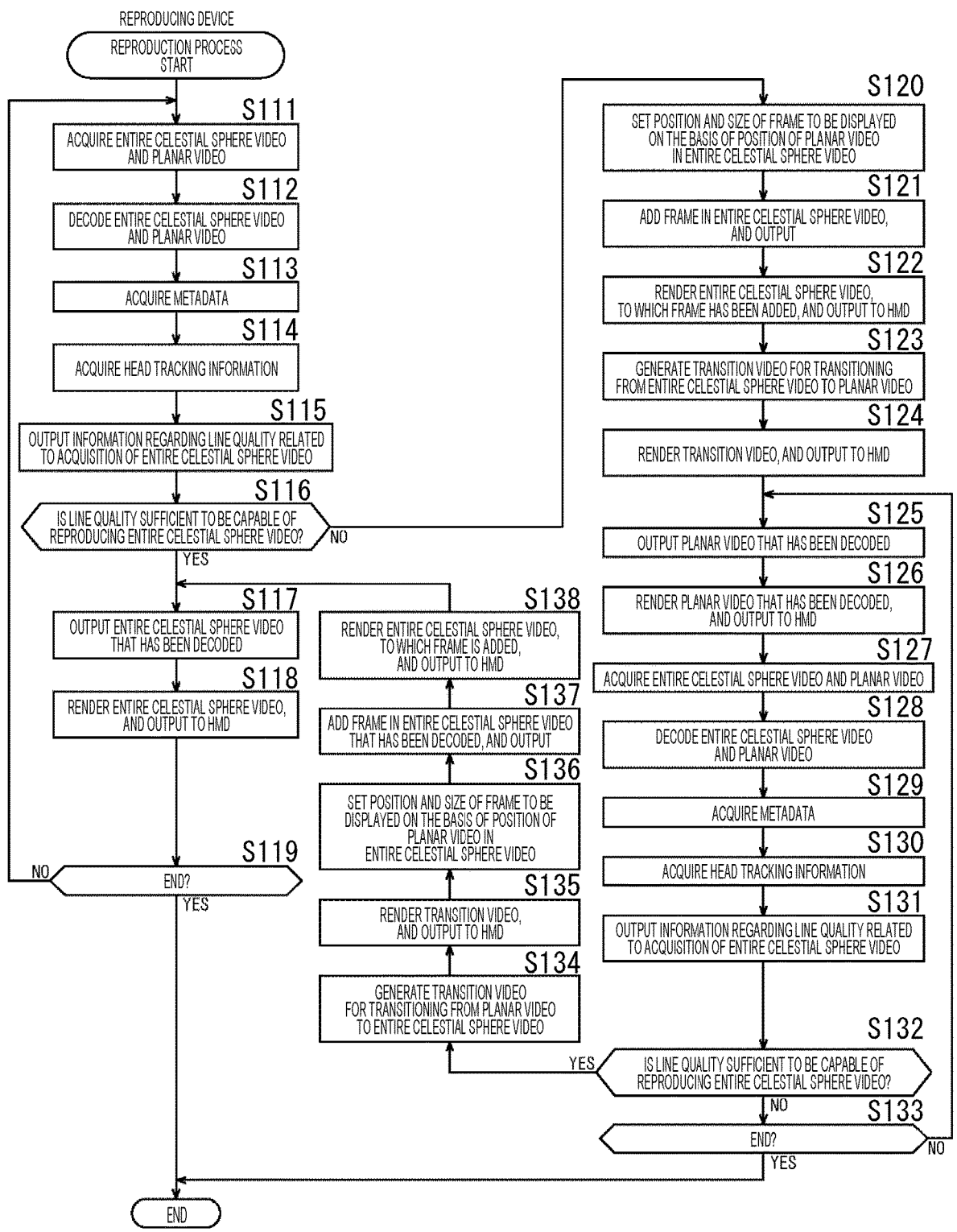
FIG. 7 is a flowchart illustrating a reproduction process by a reproducing device of FIG. 2.

It is to be noted that in the reproducing device 15, in processing the planar video, the pan-tilt information included in the metadata including the same time information is used to perform a similar process to the reproduction process of FIG. 7. Therefore, the description of the reproduction process will be omitted.

<<4. Second Embodiment>>

In the above, the description has been given with regard to an example in which in a case where the entire celestial sphere video, the planar video, and the metadata are supplied to the reproducing device 15, and in the reproducing device 15, when the entire celestial sphere video is switched to the planar video according to the line quality, a frame is added and displayed at a position corresponding to the planar video to be switched to and displayed next in the entire celestial sphere video on the basis of the metadata.

However, in the PC 13, a framed entire celestial sphere video, to which a frame indicating the position of the planar video has been added in the entire celestial sphere video, may be generated, and in addition to the entire celestial sphere video and the planar video, the framed entire celestial sphere video may be supplied to the reproducing device 15, so that the reproducing device 15 may switch and display the videos.

Figure 12:
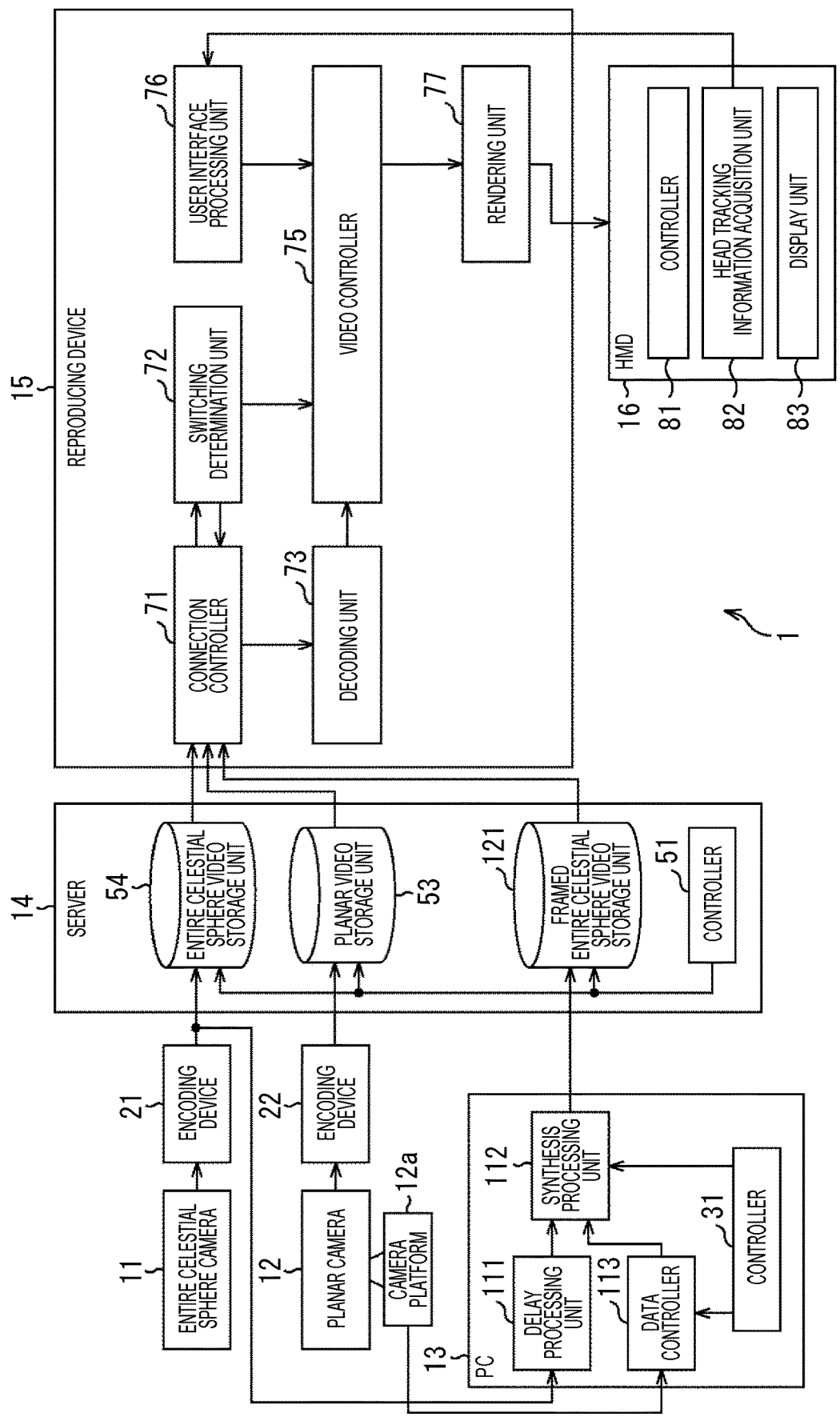
FIG. 12 is a diagram illustrating a configuration example of a reproducing system in a second embodiment of the present disclosure.

FIG. 12 shows a configuration example of the reproducing system 1, in which in the PC 13, the framed entire celestial sphere video, to which the frame indicating the position of the planar video has been added in the entire celestial sphere video, is generated, and in addition to the entire celestial sphere video and the planar video, the framed entire celestial sphere video is supplied to the reproducing device 15, so that the reproducing device 15 switches and displays the videos.

In the reproducing system 1 of FIG. 12, instead of the data controller 32 and the delay processing unit 33 of the PC 13 of FIG. 2, a delay processing unit 111, a synthesis processing unit 112, and a data controller 113 are provided. This configuration is different from the reproducing system 1 in FIG. 2.

Further, in the reproducing system 1 of FIG. 12, a framed entire celestial sphere video storage unit 121 is provided in place of the metadata storage unit 52 in the server 14 of FIG. 2. Furthermore, the meta parser unit 74 is omitted in the reproducing device 15. This configuration is different from the reproducing system 1 in FIG. 2.

The delay processing unit 111 of the PC 13 temporarily stores the entire celestial sphere video that has been captured by the entire celestial sphere camera 11, and outputs the entire celestial sphere video to the synthesis processing unit 112 to match the timing when the entire celestial sphere video is output from the entire celestial sphere camera 11.

The data controller 113 obtains the position and the size of the planar video in the entire celestial sphere video on the basis of the pan-tilt information supplied from the camera platform 12a, generates frame data for identifying the corresponding range, and outputs the frame data to the synthesis processing unit 112.

On the basis of the frame data supplied from the data controller 113, the synthesis processing unit 112 adds a video of the frame corresponding to the planar video to the entire celestial sphere video to generate a framed entire celestial sphere video, and outputs the framed entire celestial sphere video to the server 14.

The controller 51 of the server 14 acquires the framed entire celestial sphere video supplied from the PC 13, and causes the framed entire celestial sphere video storage unit 121 to store the framed entire celestial sphere video.

Then, the controller 51 reads the framed entire celestial sphere video stored in the framed entire celestial sphere video storage unit 121, and outputs the framed entire celestial sphere video to the reproducing device 15.

Consequently, the connection controller 71 in the reproducing device 15 of FIG. 12 acquires the framed entire celestial sphere video in addition to the entire celestial sphere video and the planar video supplied from the server 14, and outputs the videos to the decoding unit 73.

Further, the decoding unit 73 decodes the framed entire celestial sphere video in addition to the entire celestial sphere video and the planar video, and outputs the videos to the video controller 75.

The video controller 75 selects any of the entire celestial sphere video, the planar video, and the framed entire celestial sphere video that have been decoded on the basis of the switching determination information supplied from the switching determination unit 72, and outputs the selected one to the rendering unit 77.

<Framed Entire Celestial Sphere Video Generation Process>

Figure 13:
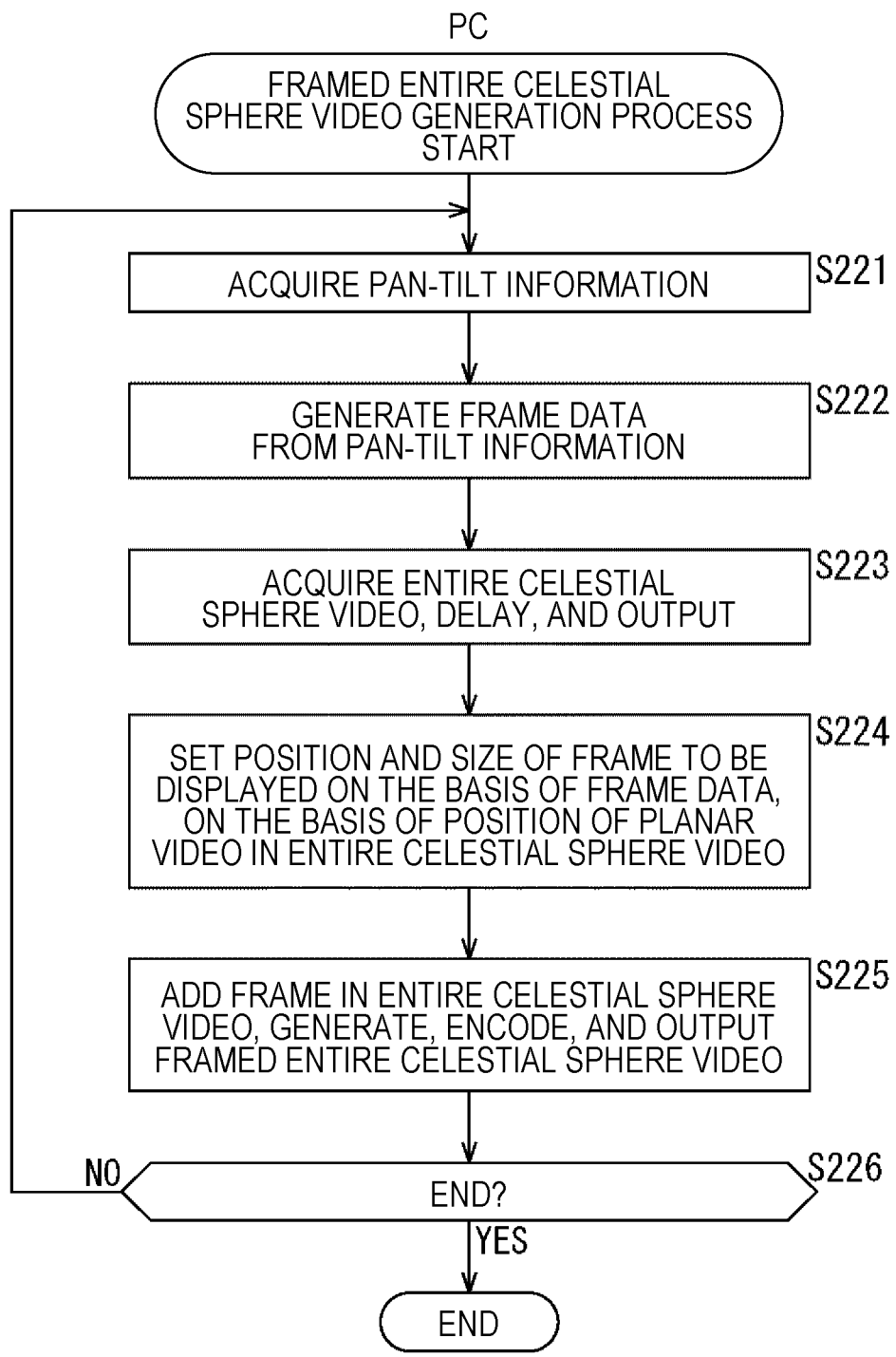
FIG. 13 is a flowchart illustrating a framed entire celestial sphere video generation process by a PC of FIG. 12.

Next, a framed entire celestial sphere video generation process in the PC 13 will be described with reference to a flowchart of FIG. 13.

It is to be noted that the framed entire celestial sphere video generation process is a process performed on the PC 13, instead of the metadata generation process that has been described with reference to the flowchart of FIG. 5.

In step S221, the data controller 113 acquires the pan-tilt information supplied from the camera platform 12a of the planar camera 12.

In step S222, the data controller 113 generates information regarding the position and the size of the frame corresponding to the planar video in the entire celestial sphere video as frame data on the basis of the pan-tilt information that has been acquired, and outputs the frame data to the synthesis processing unit 112.

In step S223, the delay processing unit 111 acquires the entire celestial sphere video supplied from the entire celestial sphere camera 11, temporarily stores the entire celestial sphere video, delays by a predetermined period, and then outputs the entire celestial sphere video to the synthesis processing unit 112.

In step S224, the synthesis processing unit 112 sets the position and the size of the frame corresponding to the planar video on the entire celestial sphere video on the basis of the frame data.

In step S225, the synthesis processing unit 112 adds a frame of the position and the size that have been set onto the entire celestial sphere video, generates a framed entire celestial sphere video, encodes the framed entire celestial sphere video, and then outputs the framed entire celestial sphere video to the server 14.

In step S226, the controller 31 determines whether or not the end of the process has been instructed. In a case where the end has not been instructed, the process returns to step S221, and the subsequent processes are repeated.

Then, in step S226, in a case where the end of the process has been instructed, the process ends.

By the above process, the frame data based on the pan-tilt information at the timing when the planar video is captured by the planar camera 12 is generated, and in addition, the framed entire celestial sphere video, to which the frame indicating the position and the size of the corresponding planar video has been added on the basis of the frame data, is generated, and is then output to the server 14.

As a result, in addition to the entire celestial sphere video and the planar video, the framed entire celestial sphere video is transmitted to the server 14.

<Video Transmission Process by Server in FIG. 12>

Next, a video transmission process by the server 14 of FIG. 12 will be described with reference to a flowchart of FIG. 14.

Figure 14:
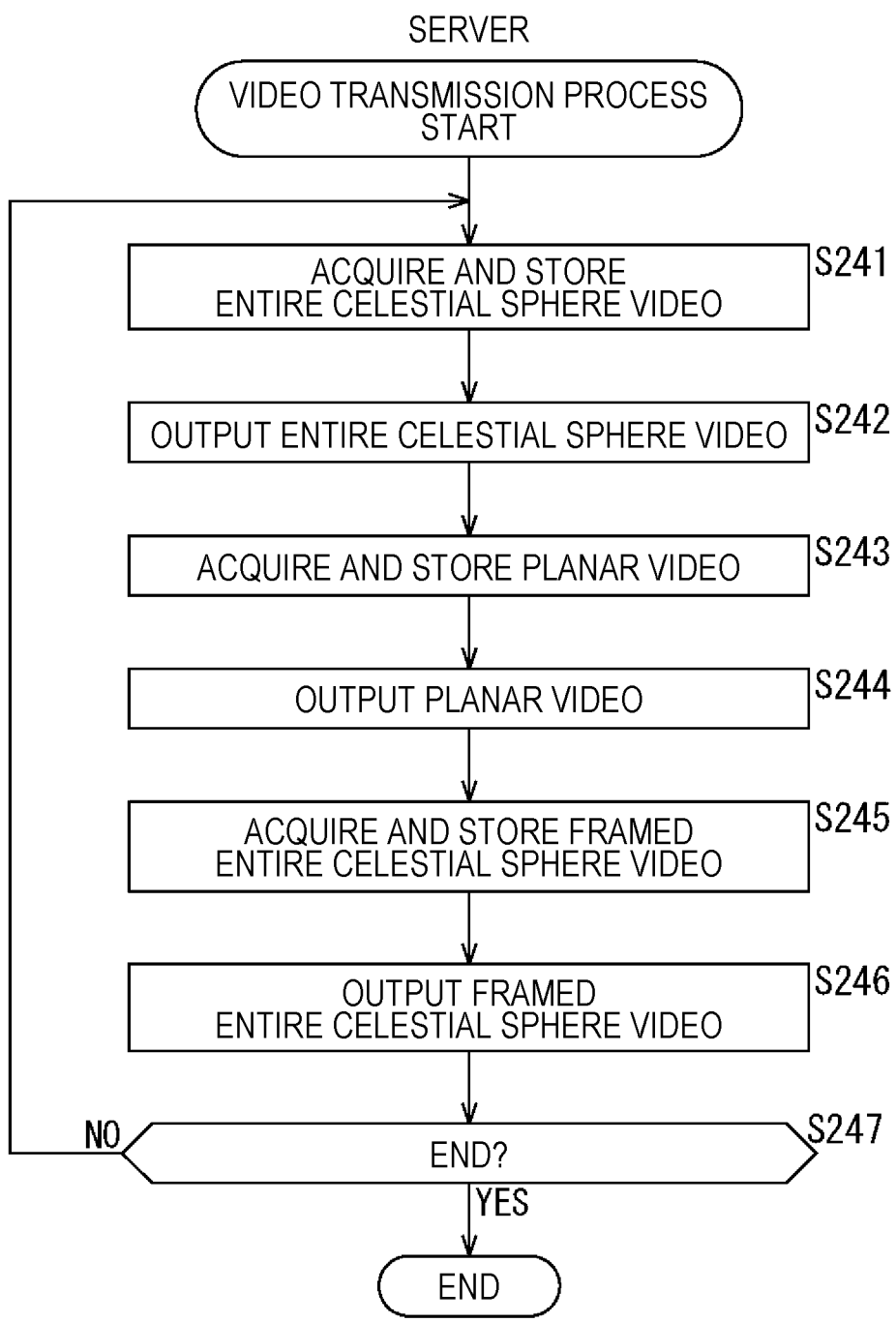
FIG. 14 is a flowchart illustrating a video transmission process by a server of FIG. 12.

It is to be noted that the processes of steps S241 to S244 and S247 in the flowchart of FIG. 14 are similar to the processes of steps S71 to S74 and S77 that have been described with reference to the flowchart of FIG. 6. Therefore, the descriptions thereof will be omitted.

That is, in step S245, the controller 51 acquires the framed entire celestial sphere video supplied from the PC 13, and causes the framed entire celestial sphere video storage unit 121 to store the framed entire celestial sphere video.

In step S246, the controller 51 reads the framed entire celestial sphere video stored in the framed entire celestial sphere video storage unit 121, and outputs the framed entire celestial sphere video to the reproducing device 15.

By the above process, the entire celestial sphere video, the planar video, and the framed entire celestial sphere video are respectively supplied from the entire celestial sphere camera 11, the planar camera 12, and the PC 13, and are transmitted to the reproducing device 15.

In such a situation, regarding the entire celestial sphere video, the planar video, and the framed entire celestial sphere video, respectively corresponding pieces of information at the same timing are supplied to the reproducing device 15.

Therefore, the processes of steps S241 and S242, the processes of steps S243 and S244, and the processes of steps S245 and S246 in the flowchart of FIG. 14 are substantially parallel processes.

<Reproduction Process by Reproducing Device in FIG. 12>

Figure 15:
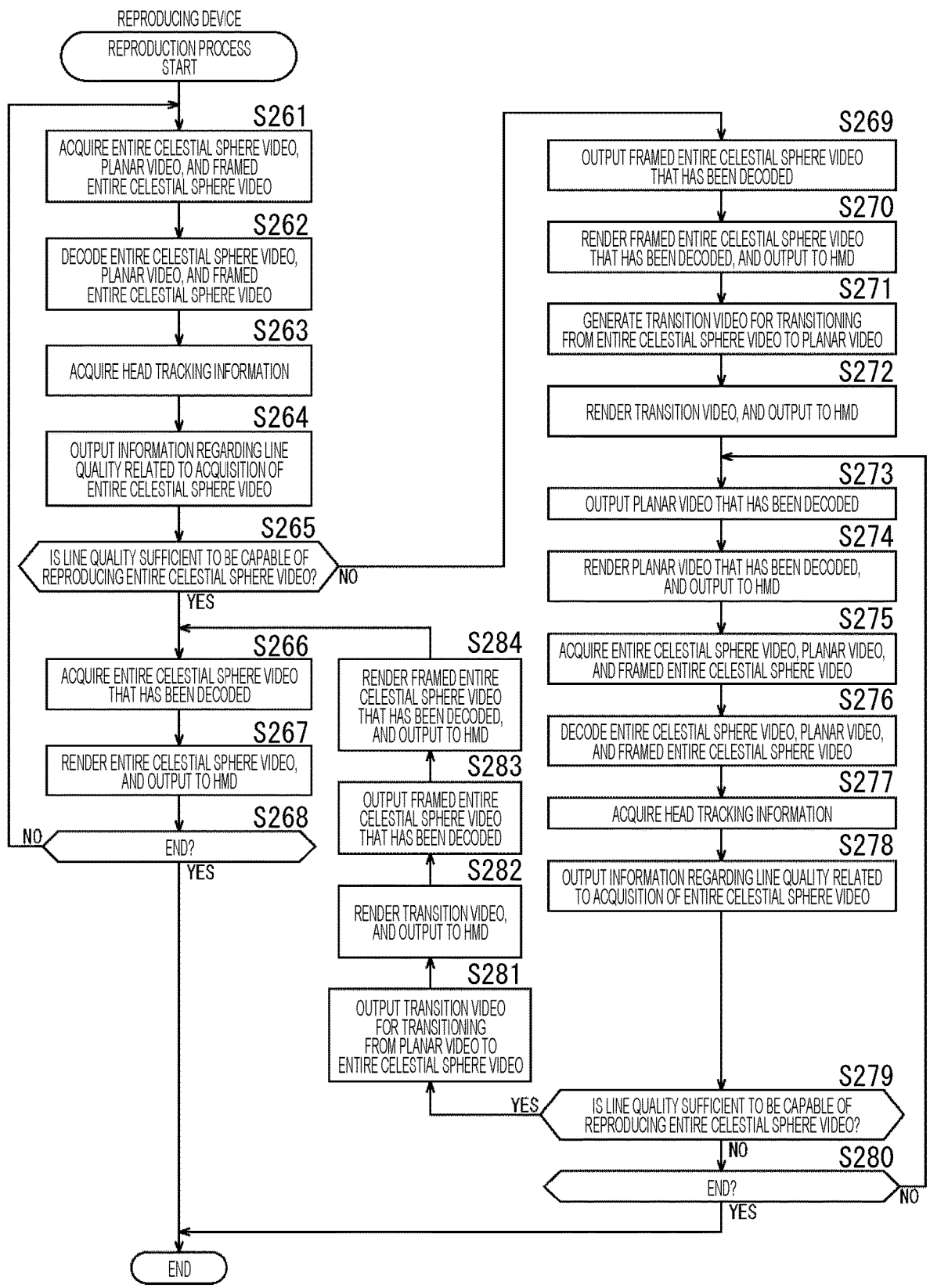
FIG. 15 is a flowchart illustrating a reproduction process by a reproducing device of FIG. 12.

Next, a reproduction process by the reproducing device 15 of FIG. 12 will be described with reference to a flowchart of FIG. 15.

In step S261, the connection controller 71 acquires the entire celestial sphere video, the planar video, and the framed entire celestial sphere video from the server 14, and outputs the videos to the decoding unit 73.

In step S262, the decoding unit 73 decodes the entire celestial sphere video, the planar video, and the framed entire celestial sphere video that have been supplied from the connection controller 71, and outputs the videos to the video controller 75. That is, the video controller 75 acquires the entire celestial sphere video, the planar video, and the framed entire celestial sphere video that have been decoded.

In step S263, the video controller 75 acquires the head tracking information from the HMD 16.

In step S264, the connection controller 71 outputs to the switching determination unit 72, information regarding, for example, the line speed or the remaining amount of the buffer data of the entire celestial sphere video and the planar video that are being received, as the information regarding the line quality of the entire celestial sphere video from the server 14. That is, the switching determination unit 72 acquires the information regarding the line speed and the remaining amount of the buffer data of the videos, as the information regarding the line quality.

In step S265, the switching determination unit 72 determines whether or not the line speed is faster than a predetermined speed or whether or not the remaining amount of the buffer data is equal to or larger than a predetermined threshold from the information regarding the line quality including the line speed and the remaining amount of the buffer data of the entire celestial sphere video and the planar video that are being received, so as to determine whether or not the line quality is sufficient to be capable of reproducing the entire celestial sphere video, that is, whether or not to reproduce the entire celestial sphere video.

In a case where it is determined in step S265 that the line quality is sufficient to reproduce the entire celestial sphere video, the switching determination unit 72 outputs the switching determination information for instructing the reproduction of the entire celestial sphere video to the video controller 75. The process proceeds to step S266.

In step S266, the video controller 75 outputs the entire celestial sphere video that has been decoded to the rendering unit 77 on the basis of the switching determination information.

In step S267, the rendering unit 77 renders the entire celestial sphere video, and outputs the entire celestial sphere video to the HMD16 for display.

In step S268, the video controller 75 determines whether or not the end of the process has been instructed. In a case where the end has not been instructed, the process returns to step S261, and the subsequent processes are repeated.

Then, in step S268, in a case where it is determined that the end has been instructed, the process ends.

On the other hand, in a case where it is determined in step S265 that the line quality is not sufficient to reproduce the entire celestial sphere video, the process proceeds to step S269.

In step S269, the video controller 75 outputs the framed entire celestial sphere video that has been decoded to the rendering unit 77.

In step S270, the rendering unit 77 renders the framed entire celestial sphere video, and outputs the framed entire celestial sphere video to the HMD 16 for display.

In step S271, the video controller 75 generates a transition video for transitioning from the entire celestial sphere video to the planar video, and outputs the transition video to the rendering unit 77.

In step S272, the rendering unit 77 renders the transition video for transitioning from the entire celestial sphere video to the planar video, and outputs the transition video to the HMD 16 for display.

In step S273, the video controller 75 outputs the planar video that has been decoded to the rendering unit 77.

In step S274, the rendering unit 77 renders a planar video, and outputs the planar video to the HMD 16 for display.

That is, by the processes of steps S270 to S274, in the HMD16, after the framed entire celestial sphere video, to which the frame indicating the position corresponding to the planar video on the entire celestial sphere video has been added, is displayed, the transition video for transitioning to the planar video is displayed, and is switched to display the planar video.

In step S275, the connection controller 71 acquires the entire celestial sphere video, the planar video, and the framed entire celestial sphere video from the server 14, and outputs the videos to the decoding unit 73.

In step S276, the decoding unit 73 decodes the entire celestial sphere video, the planar video, and the framed entire celestial sphere video that have been supplied from the connection controller 71, and outputs the videos to the video controller 75. That is, the video controller 75 acquires the entire celestial sphere video, the planar video, and the framed entire celestial sphere video that have been decoded.

In step S277, the video controller 75 acquires the head tracking information from the HMD 16.

In step S278, the connection controller 71 outputs to the switching determination unit 72, for example, the information regarding the line speed or the remaining amount of the buffer data of the entire celestial sphere video and the planar video that are being received, as the information regarding the line quality of the entire celestial sphere video from the server 14. That is, the switching determination unit 72 acquires the information regarding the line speed and the remaining amount of the buffer data of the videos, as the information regarding the line quality.

In step S279, the switching determination unit 72 determines whether or not the line speed is faster than a predetermined speed and whether or not the remaining amount of the buffer data is equal to or larger than a predetermined threshold from the information regarding the line quality including the line speed and the remaining amount of the buffer data of the entire celestial sphere video and the planar video that are being received, so as to determine whether or not the line quality is sufficient to be capable of reproducing the entire celestial sphere video, that is, whether or not to reproduce the entire celestial sphere video.

In a case where it is determined in step S279 that the line quality is not sufficient to reproduce the entire celestial sphere video, the switching determination unit 72 outputs the switching determination information for instructing the reproduction of the planar video to the video controller 75. The process proceeds to step S280.

In step S280, the video controller 75 determines whether or not the end of the process has been instructed. In a case where the end has not been instructed, the process returns to step S273, and the subsequent processes are repeated.

Then, in step S280, in a case where it is determined that the end has been instructed, the process ends.

That is, in a case where a state in which the sufficient line quality for reproducing the entire celestial sphere video cannot be obtained continues, the processes of steps S273 to S280 are repeated, and the planar video is continuously rendered and displayed on the HMD 16.

Further, in step S279, in a case where it is determined that the line quality is sufficient to reproduce the entire celestial sphere video, the switching determination unit 72 outputs the switching determination information for instructing the reproduction of the entire celestial sphere video to the video controller 75. The process proceeds to step S281.

In step S281, the video controller 75 generates the transition video for transitioning from the planar video to the entire celestial sphere video, and outputs the transition video to the rendering unit 77.

In step S282, the rendering unit 77 outputs the transition video to the HMD 16 for display.

In step S283, the video controller 75 outputs the framed entire celestial sphere video that has been decoded to the rendering unit 77.

In step S284, the rendering unit outputs the framed entire celestial sphere video to the HMD 16 for display. The process returns to step S266.

That is, by a reverse process of a case where the entire celestial sphere video transitions to the planar video, also in a case where the planar video transitions to the entire celestial sphere video, after transitioning to the entire celestial sphere video by the transition video, the framed entire celestial sphere video displayed, and then the entire celestial sphere video is displayed.

<Display Process by HMD in FIG. 12>

Figure 16:
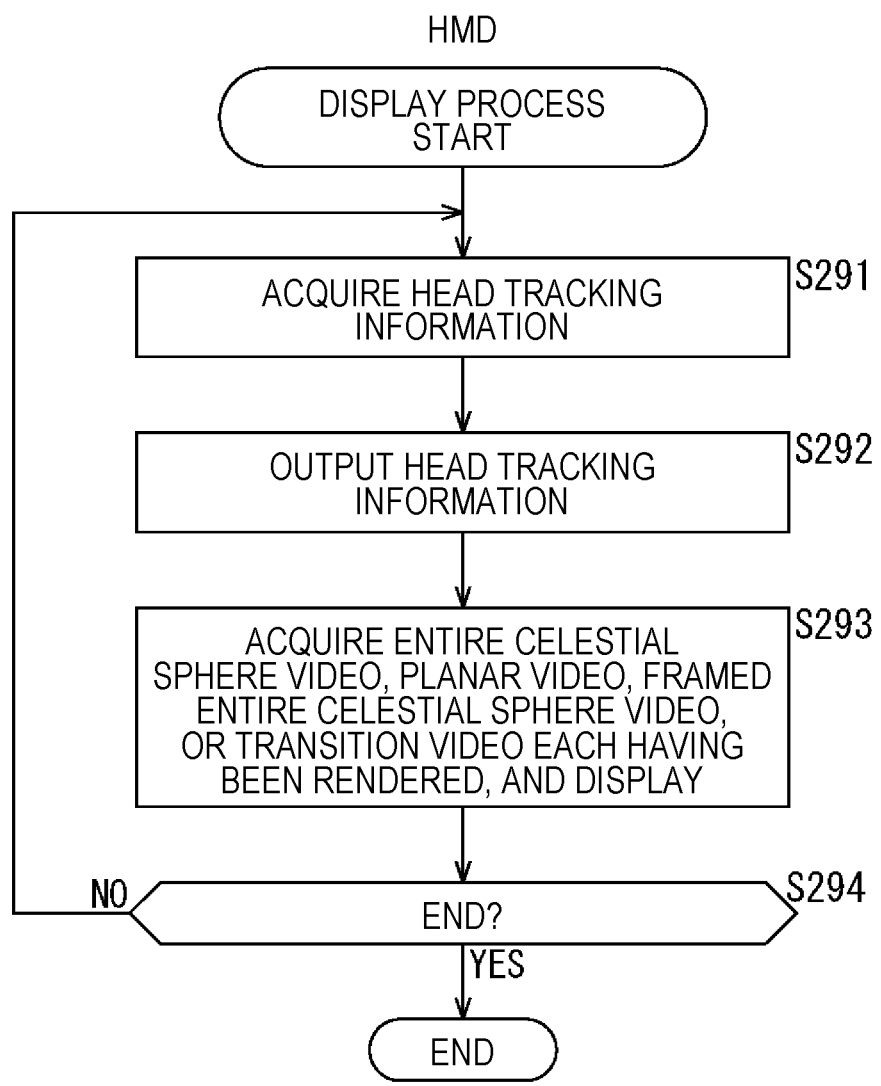
FIG. 16 is a flowchart illustrating a display process by an HMD of FIG. 12.

Next, a display process by the HMD 16 of FIG. 12 will be described with reference to a flowchart of FIG. 16.

In step S291, the head tracking information acquisition unit 82 of the HMD 16 acquires head tracking information of the user.

In step S292, the head tracking information acquisition unit 82 outputs the head tracking information that has been acquired to the reproducing device 15.

In step S293, the controller 81 acquires the entire celestial sphere video, the planar video, the transition video, or the framed entire celestial sphere video supplied from the reproducing device 15, and causes the display unit 83 to display.

In step S294, the controller 81 determines whether or not the end of the process has been instructed. In a case where the end has not been instructed, the process returns to step S291, and the subsequent processes are repeated.

Then, in step S294, in a case where it is determined that the end has been in the process ends.

By the above series of processes, the head tracking information is acquired, and is continuously output to the reproducing device 15, and in addition, the entire celestial sphere video, the planar video, or the framed entire celestial sphere video supplied from the reproducing device 15 is acquired, and is displayed continuously on the display unit 83.

Consequently, the entire celestial sphere video or the planar video is switched according to the line quality. When switched, the framed entire celestial sphere video, to which a frame of the position and the size of the corresponding planar video has been added in the entire celestial sphere video, is displayed, so that the user can recognize that the planar video at which position has been switched to even when the entire celestial sphere video is switched to the planar video.

In addition, also when the planar video is switched to the entire celestial sphere video, the framed entire celestial sphere video is temporarily displayed after the transition, so as to enable recognition that the entire celestial sphere video has been switched from the planar video at which position in the entire celestial sphere video.

As a result, switching between the wide angle of view video and the planar video that is a part of the wide angle of view video is enabled without a sense of incongruity for viewing.

<<5. Example to be Performed by Software>>

The above-described series of processes, by the way, can be performed by hardware, but can also be performed by software. In a case where a series of processes are performed by software, a program constituting the software is installed into a computer embedded in dedicated hardware, or various programs are installed into, for example, a general-purpose computer or the like capable of performing various functions from a recording medium.

Figure 17:
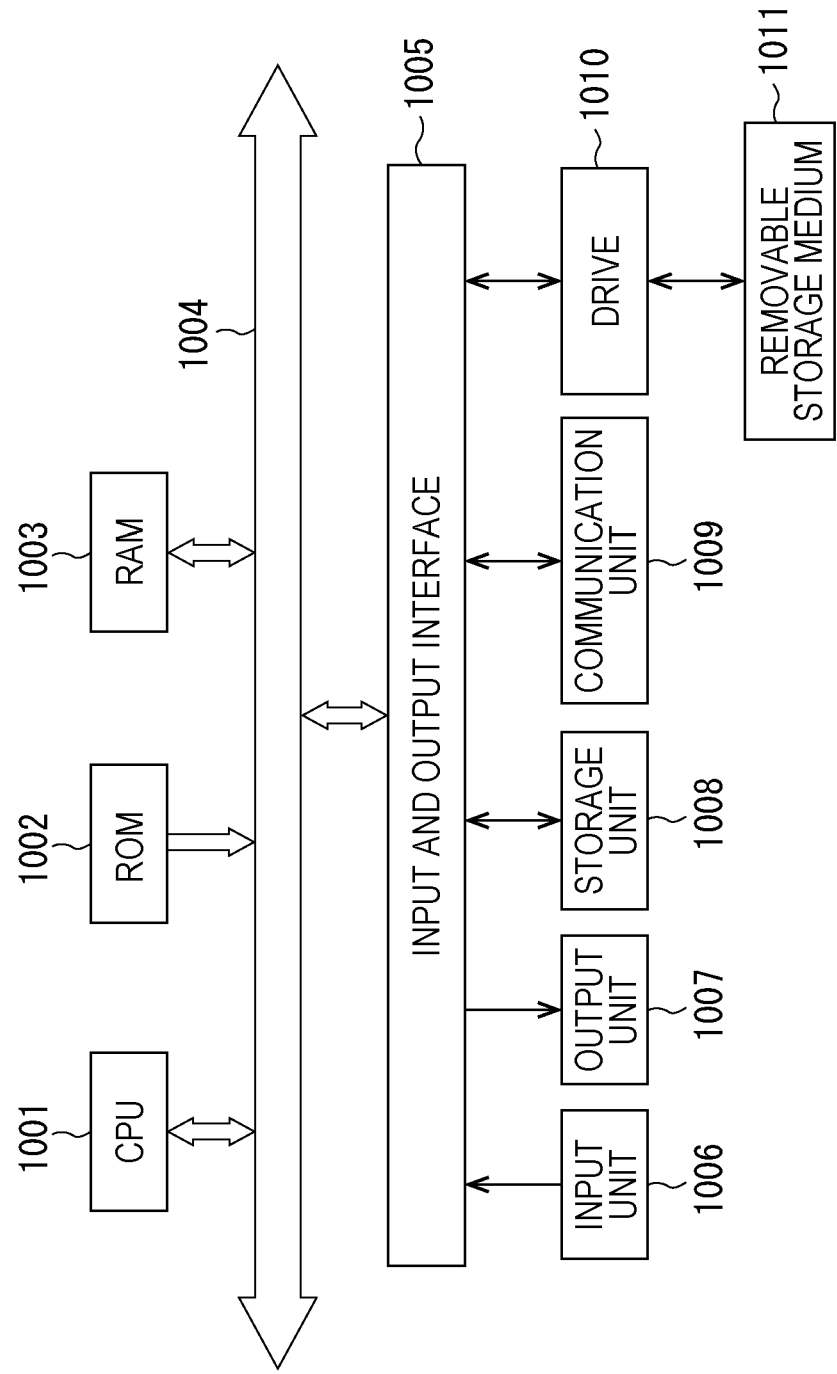
FIG. 17 is a diagram illustrating a configuration example of a general-purpose personal computer.

FIG. 17 shows a configuration example of a general-purpose computer. Such a personal computer includes a central processing unit (CPU) 1001 that is built in. An input and output interface 1005 is connected with the CPU 1001 via a bus 1004. A read only memory (ROM) 1002 and a random access memory (RAM) 1003 are connected with the bus 1004.

The input and output interface 1005 is connected with an input unit 1006 including input devices such as a keyboard and a mouse for a user to input operation commands, an output unit 1007 for outputting a process operation screen and an image of the process result to a display device, a storage unit 1008 including a hard disk drive or the like for storing programs and various data, and a communication unit 1009 including a local area network (LAN) adapter or the like, and performing a communication process via a network represented by the Internet. Also connected is a drive 1010 for reading data from and writing data into a magnetic disk (including a flexible disk), an optical disk (including a compact disc-read only memory (CD-ROM) and a digital versatile disc (DVD), a magneto-optical disk (including a mini, disc (MD)), or a removable storage medium 1011 such as a semiconductor memory.

The CPU 1001 performs various processes according to the program stored in the ROM 1002 or the program that has been read from a removable storage medium 1011 such as a magnetic disk, an optical disk, a magneto-optical disk, or a semiconductor memory, installed into the storage unit 1008, and loaded from the storage unit 1008 into the RAM 1003. In the RAM 1003, for example, data necessary for the CPU 1001 to perform various processes is also appropriately stored.

In the computer configured as described above, the CPU 1001 loads the program stored in the storage unit 1008 into the RAM 1003 via the input and output interface 1005 and the bus 1004, and performs the above-described series of processes.

The program performed by the computer (the CPU 1001) can be recorded into the removable storage medium 1011 to be supplied as a package medium or the like, for example. In addition, programs can also be supplied via a wired or wireless transmission medium such as a local area network, the Internet, and digital satellite broadcasting.

On the computer, the program can be installed into the storage unit 1008 via the input and output interface 1005 by attaching the removable storage medium 1011 onto the drive 1010. Further, the program can be received by the communication unit 1009 and installed into the storage unit 1008 via a wired or wireless transmission medium. In addition, the program can be installed beforehand into the ROM 1002 or the storage unit 1008.

It is to be noted that the program performed by the computer may be a program that is processed in time series according to the order described in the present specification, or may be a program that is processed in parallel or at a necessary timing such as when a call is made.

It is to be noted that the CPU 1001 in FIG. 17 realizes the functions of the controllers 31, 51, 81 and the video controller 75 in FIG. 2.

Further, in the present specification, a system means a set of a plurality of components (devices, modules (parts), and the like), and whether or not all the components are included in the same housing does not a matter. Therefore, a plurality of devices accommodated an separate housings and connected via a network, and a device in which a plurality of modules is accommodated in one housing are both the systems.

It is to be noted that the embodiments of the present disclosure is not limited to the above-described embodiments, and various changes can be made without departing from the gist of the present disclosure.

For example, the present disclosure can be configured as cloud computing in which a plurality of devices shares one function via a network and process in cooperation.

Further, each step described in the above-mentioned flowchart can be performed by one device or can be shared and performed by a plurality of devices.

Furthermore, in a case where one step includes a plurality of processes, the plurality of processes included in such one step can be performed by one device or shared by a plurality of devices.

It is to be noted that the present disclosure may also have the following configuration.

<1> A reproducing device including:

a switching determination unit configured to determine whether or not a switching condition for switching a display between a wide angle of view video and a partial video is satisfied, the partial video corresponding to a partial angle of view of the wide angle of view video; and a video controller configured to selectively display the wide angle of view video and the partial video on the basis of a determination result of the switching determination unit, in which when switching the display between the wide angle of view video and the partial video on the basis of the determination result of the switching determination unit, the video controller displays the wide angle of view video, to which display information indicating an angle of view of the partial video corresponding to the wide angle of view video has been added.

<2> The reproducing device described in the above <1> further including a video acquisition unit configured to acquire the wide angle of view video and the partial video from a server that is externally provided.

<3> The reproducing device described in the above <2, in which the switching determination unit determines whether or not the switching condition for switching the display between the wide angle of view video and the partial video is satisfied on the basis of a line quality with the server from which the video acquisition unit acquires the wide angle of view video.

<4> The reproducing device described in the above <3, in which the switching condition includes at least one of whether or not the line quality is faster than a predetermined line speed or whether or not a remaining amount of buffer data of the wide angle of view video and the partial video is larger than a predetermined threshold.

<5> The reproducing device described in the above <2> further including a metadata acquisition unit configured to acquire metadata for identifying a position and a size of the angle of view of the partial video corresponding to the wide angle of view video from the server, in which the video controller displays the wide angle of view video, to which the display information indicating the angle of view of the partial video corresponding to the wide angle of view video has been added on the basis of the metadata.

<6> The reproducing device described in the above <5>, in which the metadata is generated on the basis of pan-tilt information including information regarding a video-capturing position and pan-tilt of a partial video capturing unit that captures the partial video.

<7> The reproducing device described in the above <5>, in which the metadata acquisition unit acquires the metadata in the state of being adjusted for acquiring the metadata at a same timing with a timing when the video acquisition unit acquires the partial video.

<8> The reproducing device described in the above <5>, in which the metadata acquisition unit acquires the metadata including time information when the partial video corresponding is supplied, and the video controller uses the metadata including the time information corresponding to the partial video to display the wide angle of view video, to which the display information indicating the angle of view of the partial video corresponding to the wide angle of view video has been added.

<9> The reproducing any device described in an of the above <1> to <8>, in which the display information indicating the angle of view of the partial video corresponding to the wide angle of view video includes a frame indicating the angle of view of the partial video corresponding to the wide angle of view video.

<10> The reproducing device described in the above <2>, in which in addition to the wide angle of view video and the partial video, the video acquisition unit acquires the wide angle of view video, to which the display information indicating the angle of view of the partial video corresponding to the wide angle of view video has been added.

<11> The reproducing device described in the above <10>, in which the wide angle of view video, to which the display information indicating the angle of view of the partial video corresponding to the wide angle of view video has been added, is generated by adding the display information to the wide angle of view video on the basis of pan-tilt information including a video-capturing position and information regarding pan-tilt of a partial video capturing unit that captures the partial video.

<12> The reproducing device described in the above <1>, in which the switching determination unit determines whether or not the switching condition for switching the display between the wide angle of view video and the partial video is satisfied on the basis of a presentation content of a content including the wide angle of view video.

<13> The reproducing device described in any of the above <1> to <12>,
in which in a case where the wide angle of view video is displayed, the video controller displays the wide angle of view video, to which the display information indicating the angle of view of the partial video corresponding to the wide angle of view video has been added, at a timing immediately before switching the display from the wide angle of view video to the partial video on the basis of the determination result of the switching determination unit.

<14> The reproducing device described in the above <13>,
in which when switching the display from the wide angle of view video to the partial video, the video controller displays a transition video for transitioning from the wide angle of view video to the partial video.

<15> The reproducing device described in the above <14>,
in which when switching the display from the wide angle of view video to the partial video, the video controller displays the transition video for transitioning to the partial video while expanding an angle of view of the wide angle of view video.

<16> The reproducing device described in any of the above <1> to <12>,
in which in a case where the partial video is displayed, the video controller displays the wide angle of view video, to which the display information indicating the angle of view of the partial video corresponding to the wide angle of view video has been added, at a timing immediately after switching the display from the partial video to the wide angle of view video on the basis of the determination result of the switching determination unit.

<17> The reproducing device described in the above <16>,
in which when switching the display from the partial video to the wide angle of view video, the video controller displays a transition video for transitioning from the partial video to the wide angle of view video.

<18> The reproducing device described in the above <17>,
in which when switching the display from the partial video to the wide angle of view video, the video controller displays the transition video for transitioning to the wide angle of view video while reducing the angle of view of the partial video.

<19> A reproducing method including:
a switching determination process for determining whether or not a switching condition for switching a display between a wide angle of view video and a partial video is satisfied, the partial video corresponding to a partial angle of view of the wide angle of view video; and
a video control process for selectively displaying the wide angle of view video and the partial video on the basis of a determination result of the switching determination process,
in which when switching the display between the wide angle of view video and the partial video on the basis of the determination result of the switching determination process, the video control process displays the wide angle of view video, to which display information indicating an angle of view of the partial video corresponding to the wide angle of view video has been added.

<20> A program for causing a computer to function as:
a switching determination unit configured to determine whether or not a switching condition for switching a display between a wide angle of view video and a partial video is satisfied, the partial video corresponding to a partial angle of view of the wide angle of view video; and
a video controller configured to selectively display the wide angle of view video and the partial video on the basis of a determination result of the switching determination unit,
in which when switching the display between the wide angle of view video and the partial video on the basis of the determination result of the switching determination unit, the video controller displays the wide angle of view video, to which display information indicating an angle of view of the partial video corresponding to the wide angle of view video has been added.

REFERENCE SIGNS LIST

1 Reproducing system
11 Entire celestial sphere camera
12 Planar camera
13 PC
14 Server
15 Reproducing device, HMD
31 Controller
32 Data controller
33 Delay processing unit
51 Controller
52 Metadata storage unit
53 Planar video storage unit
54 Entire celestial sphere video storage unit
71 Connection controller
72 Switching determination unit
73 Decoding unit
74 Meta parser unit
75 Video controller
76 Rendering unit
81 Controller
82 Head tracking information acquisition unit
83 Display unit
91 Reception metadata storage unit
92 Video monitoring unit
93 Time information generation unit
94 Transmission metadata storage unit
111 Delay processing unit
112 Synthesis processing unit
113 Data controller
121 Framed entire celestial sphere video storage unit

The invention claimed is:

1. A reproducing device comprising:
a switching determination unit configured to determine whether or not a switching condition for switching a display between a wide angle of view video and a partial video is satisfied, the partial video corresponding to a partial angle of view within the wide angle of view video; and
a video controller configured to selectively display the wide angle of view video or the partial video on a basis of a determination result of the switching determination unit,
wherein when switching the display between the wide angle of view video and the partial video on a basis of the determination result of the switching determination unit, the video controller displays the wide angle of view video, to which display information indicating the partial angle of view of the partial video corresponding to the wide angle of view video has been added,
wherein the display information indicating the partial angle of view of the partial video corresponding to the wide angle of view video includes a frame indicating the partial angle of view of the partial video within the wide angle of view video, and wherein the switching determination unit and the video controller are each implemented via at least one processor.

2. The reproducing device according to claim 1, further comprising:

a video acquisition unit configured to acquire the wide angle of view video and the partial video from a server that is externally provided, wherein the video acquisition unit is implemented via at least one processor.

3. The reproducing device according to claim 2, wherein the switching determination unit determines whether or not the switching condition for switching the display between the wide angle of view video and the partial video is satisfied on a basis of a line quality with the server from which the video acquisition unit acquires the wide angle of view video.

4. The reproducing device according to claim 3, wherein the switching condition includes at least one of whether or not the line quality is faster than a predetermined line speed or whether or not a remaining amount of buffer data of the wide angle of view video and the partial video is larger than a predetermined threshold.

5. The reproducing device according to claim 2, further comprising:

a metadata acquisition unit configured to acquire metadata for identifying a position and a size of the partial angle of view of the partial video corresponding to the wide angle of view video from the server, wherein the video controller displays the wide angle of view video, to which the display information indicating the partial angle of view of the partial video corresponding to the wide angle of view video has been added on a basis of the metadata, and wherein the metadata acquisition unit is implemented via at least one processor.

6. The reproducing device according to claim 5, wherein the metadata is generated on a basis of pan-tilt information including information regarding a video-capturing position and pan-tilt of a partial video capturing unit that captures the partial video.

7. The reproducing device according to claim 5, wherein the metadata acquisition unit acquires the metadata in the state of being adjusted for acquiring the metadata at a same timing with a timing when the video acquisition unit acquires the partial video.

8. The reproducing device according to claim 5, wherein the metadata acquisition unit acquires the metadata including time information when the partial video corresponding to the metadata is supplied, and wherein the video controller uses the metadata including the time information corresponding to the partial video to display the wide angle of view video, to which the display information indicating the partial angle of view of the partial video corresponding to the wide angle of view video has been added.

9. The reproducing device according to claim 2, wherein in addition to the wide angle of view video and the partial video, the video acquisition unit acquires the wide angle of view video, to which the display information indicating the partial angle of view of the partial video corresponding to the wide angle of view video has been added.

10. The reproducing device according to claim 9, wherein the wide angle of view video, to which the display information indicating the partial angle of view of the partial video corresponding to the wide angle of view video has been added, is generated by adding the display information to the wide angle of view video on a basis of pan-tilt information including a video-capturing position and information regarding pan-tilt of a partial video capturing unit that captures the partial video.

11. The reproducing device according to claim 1, wherein the switching determination unit determines whether or not the switching condition for switching the display between the wide angle of view video and the partial video is satisfied on a basis of a presentation content of a content including the wide angle of view video.

12. The reproducing device according to claim 1, wherein in a case where the wide angle of view video is displayed, the video controller displays the wide angle of view video, to which the display information indicating the partial angle of view of the partial video corresponding to the wide angle of view video has been added, at a timing immediately before switching the display from the wide angle of view video to the partial video on a basis of the determination result of the switching determination unit.

13. The reproducing device according to claim 12, wherein when switching the display from the wide angle of view video to the partial video, the video controller displays a transition video for transitioning from the wide angle of view video to the partial video.

14. The reproducing device according to claim 13, wherein when switching the display from the wide angle of view video to the partial video, the video controller displays the transition video for transitioning to the partial video while expanding an angle of view of the wide angle of view video.

15. The reproducing device according to claim 1, wherein in a case where the partial video is displayed, the video controller displays the wide angle of view video, to which the display information indicating the partial angle of view of the partial video corresponding to the wide angle of view video has been added, at a timing immediately after switching the display from the partial video to the wide angle of view video on a basis of the determination result of the switching determination unit.

16. The reproducing device according to claim 15, wherein when switching the display from the partial video to the wide angle of view video, the video controller displays a transition video for transitioning from the partial video to the wide angle of view video.

17. The reproducing device according to claim 16, wherein when switching the display from the partial video to the wide angle of view video, the video controller displays the transition video for transitioning to the wide angle of view video while reducing the partial angle of view of the partial video.

18. A reproducing method comprising:

determining whether or not a switching condition for switching a display between a wide angle of view video and a partial video is satisfied, the partial video corresponding to a partial angle of view of the wide angle of view video; and selectively displaying the wide angle of view video or the partial video on a basis of a determination result related to the switching condition, wherein when switching the display between the wide angle of view video and the partial video on a basis of the determination result of the switching determination process, the video control process displays the wide angle of view video, to which display information indicating an angle of view of the partial video corresponding to the wide angle of view video has been added, wherein the display information indicating the partial angle of view of the partial video corresponding to the wide angle of view video includes a frame indicating the partial angle of view of the partial video within the wide angle of view video.

19. A non-transitory computer-readable storage medium having embodied thereon a program, which when executed by a computer causes the computer to execute a method, the method comprising:

determining whether or not a switching condition for switching a display between a wide angle of view video and a partial video is satisfied, the partial video corresponding to a partial angle of view of the wide angle of view video; and selectively displaying the wide angle of view video or the partial video on a basis of a determination result related to the switching condition, wherein when switching the display between the wide angle of view video and the partial video on a basis of the determination result of the switching determination unit, the video controller displays the wide angle of view video, to which display information indicating an angle of view of the partial video corresponding to the wide angle of view video has been added, wherein the display information indicating the partial angle of view of the partial video corresponding to the wide angle of view video includes a frame indicating the partial angle of view of the partial video within the wide angle of view video.

\* \* \* \* \*